(12) United States Patent
Lemay et al.

(10) Patent No.: US 8,788,954 B2
(45) Date of Patent: Jul. 22, 2014

(54) WEB-CLIP WIDGETS ON A PORTABLE MULTIFUNCTION DEVICE

(75) Inventors: Stephen O. Lemay, San Francisco, CA (US); Richard Williamson, Los Gatos, CA (US); Scott Forstall, Mountain View, CA (US); Chris Blumenberg, San Francisco, CA (US); Timothy P. Omernick, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 898 days.

(21) Appl. No.: 11/969,912

(22) Filed: Jan. 6, 2008

(65) Prior Publication Data
US 2008/0201650 A1 Aug. 21, 2008

Related U.S. Application Data

(60) Provisional application No. 60/937,993, filed on Jun. 29, 2007, provisional application No. 60/946,712, filed on Jun. 27, 2007, provisional application No. 60/879,469, filed on Jan. 8, 2007, provisional application No. 60/883,805, filed on Jan. 7, 2007, provisional application No. 60/879,253, filed on Jan. 7, 2007.

(51) Int. Cl.
*G06F 3/048* (2013.01)
*H04M 1/725* (2006.01)
*G06F 17/30* (2006.01)
*H04M 1/2745* (2006.01)

(52) U.S. Cl.
CPC ..... *G06F 17/30905* (2013.01); *H04M 1/72522* (2013.01); *H04M 1/72561* (2013.01); *H04M 1/274525* (2013.01); *H04M 1/72552* (2013.01); *G06F 17/30884* (2013.01); *H04M 1/274583* (2013.01); *Y10S 715/967* (2013.01)
USPC ............ 715/763; 715/967; 715/702; 715/863

(58) Field of Classification Search
CPC .. G06F 3/0481; G06F 3/04817; G06F 3/0488
USPC .................................. 715/810, 763, 967, 702
See application file for complete search history.

(56) References Cited

U.S. PATENT DOCUMENTS

| 5,146,556 A | 9/1992 | Hullot et al. .................. 395/159 |
| 5,196,838 A | 3/1993 | Meier et al. | |

(Continued)

FOREIGN PATENT DOCUMENTS

| CA | 2349649 | 1/2002 |
| CN | 1257247 | 6/2000 |

(Continued)

OTHER PUBLICATIONS

Thomas et al., "Applying Cartoon Animation Techniques to Graphical User Interfaces," ACM Transactions on Computer-Human Interaction, vol. 8, No. 3, Sep. 2001, pp. 198-222.

(Continued)

*Primary Examiner* — Daeho Song
(74) *Attorney, Agent, or Firm* — Morrison & Foerster LLP

(57) ABSTRACT

A computer-implemented method for use at a portable multifunction device with a touch screen display includes displaying a web page or portion thereof on the touch screen display. An activation of an options icon is detected. In response, a plurality of icons including a web-clip widget creation icon is displayed. An activation of the web-clip widget creation icon is detected; in response, a web-clip widget is created corresponding to the displayed web page or portion thereof.

31 Claims, 32 Drawing Sheets

(56) References Cited

U.S. PATENT DOCUMENTS

| | | |
|---|---|---|
| 5,491,778 A | 2/1996 | Gordon et al. |
| 5,642,490 A | 6/1997 | Morgan et al. .................. 395/342 |
| 5,644,739 A | 7/1997 | Moursund ..................... 715/840 |
| 5,657,049 A | 8/1997 | Ludolph et al. |
| 5,726,687 A | 3/1998 | Belfiore et al. ............... 345/341 |
| 5,745,096 A | 4/1998 | Ludolph et al. |
| 5,745,910 A | 4/1998 | Piersol et al. |
| 5,754,179 A | 5/1998 | Hocker et al. |
| 5,757,371 A | 5/1998 | Oran et al. ..................... 715/779 |
| 5,760,773 A | 6/1998 | Berman et al. ................. 345/347 |
| 5,796,401 A | 8/1998 | Winer ............................ 345/433 |
| 5,812,862 A | 9/1998 | Smith et al. |
| 5,825,349 A | 10/1998 | Meier et al. |
| 5,825,357 A | 10/1998 | Malamud et al. ............. 715/779 |
| 5,877,765 A | 3/1999 | Dickman et al. .............. 345/349 |
| 5,914,716 A | 6/1999 | Rubin et al. ................... 345/347 |
| 5,914,717 A | 6/1999 | Kleewein et al. .............. 345/352 |
| 5,923,327 A | 7/1999 | Smith et al. ................... 345/341 |
| 5,995,106 A | 11/1999 | Naughton et al. .............. 345/357 |
| 6,043,818 A | 3/2000 | Nakano et al. |
| 6,049,336 A | 4/2000 | Liu et al. ........................ 345/353 |
| 6,072,486 A | 6/2000 | Sheldon et al. ................ 715/835 |
| 6,111,573 A | 8/2000 | McComb et al. |
| 6,133,914 A | 10/2000 | Rogers et al. .................. 345/334 |
| 6,144,863 A | 11/2000 | Charron ......................... 455/566 |
| 6,195,094 B1 | 2/2001 | Celebiler ........................ 345/339 |
| 6,229,542 B1 | 5/2001 | Miller ............................ 345/358 |
| 6,256,008 B1 | 7/2001 | Sparks et al. |
| 6,262,735 B1 | 7/2001 | Etelapera |
| 6,275,935 B1 | 8/2001 | Barlow et al. .................. 713/182 |
| 6,278,454 B1 | 8/2001 | Krishnan ........................ 345/349 |
| 6,313,853 B1 | 11/2001 | Lamontagne et al. |
| 6,317,140 B1 | 11/2001 | Livingston |
| 6,323,846 B1 | 11/2001 | Westerman et al. ........... 345/173 |
| 6,353,451 B1 | 3/2002 | Teibel et al. ................... 345/803 |
| 6,377,698 B1 | 4/2002 | Cumoli et al. |
| 6,396,520 B1 | 5/2002 | Ording .......................... 345/798 |
| 6,433,801 B1 | 8/2002 | Moon et al. .................... 345/840 |
| 6,545,669 B1 | 4/2003 | Kinawi et al. .................. 345/173 |
| 6,570,557 B1 | 5/2003 | Westerman et al. ........... 345/173 |
| 6,590,568 B1 | 7/2003 | Astala et al. ................... 345/173 |
| 6,621,768 B1 | 9/2003 | Keller et al. |
| 6,629,793 B1 | 10/2003 | Miller |
| 6,677,932 B1 | 1/2004 | Westerman .................... 345/173 |
| 6,700,612 B1 | 3/2004 | Anderson et al. |
| 6,710,788 B1 | 3/2004 | Freach et al. |
| 6,727,916 B1 | 4/2004 | Ballard |
| 6,763,388 B1 | 7/2004 | Tsimelzon ..................... 709/228 |
| 6,781,575 B1 | 8/2004 | Hawkins et al. ............... 345/173 |
| 6,915,294 B1* | 7/2005 | Singh et al. ........................... 1/1 |
| 6,931,601 B2 | 8/2005 | Vronay et al. ................. 715/767 |
| 6,934,911 B2 | 8/2005 | Salmimaa et al. |
| 6,970,749 B1 | 11/2005 | Chinn et al. |
| 6,976,210 B1 | 12/2005 | Silva et al. ..................... 715/513 |
| 6,978,127 B1 | 12/2005 | Bulthuis et al. ............... 455/412.1 |
| 6,987,991 B2 | 1/2006 | Nelson |
| 6,990,452 B1 | 1/2006 | Ostermann et al. |
| 7,007,239 B1 | 2/2006 | Hawkins et al. |
| 7,071,943 B2 | 7/2006 | Adler ............................. 345/473 |
| 7,093,201 B2 | 8/2006 | Duarte |
| 7,134,095 B1 | 11/2006 | Smith et al. .................... 715/860 |
| 7,167,731 B2 | 1/2007 | Nelson |
| 7,221,933 B2 | 5/2007 | Sauer et al. |
| 7,231,229 B1 | 6/2007 | Hawkins et al. ............... 455/564 |
| 7,283,845 B2 | 10/2007 | De Bast ......................... 455/566 |
| 7,355,593 B2 | 4/2008 | Hill et al. ....................... 345/173 |
| 7,360,166 B1* | 4/2008 | Krzanowski ................... 715/767 |
| 7,362,331 B2 | 4/2008 | Ording .......................... 345/798 |
| 7,432,928 B2 | 10/2008 | Shaw et al. .................... 345/473 |
| 7,434,177 B1 | 10/2008 | Ording et al. .................. 715/862 |
| 7,487,467 B1 | 2/2009 | Kawahara et al. |
| 7,490,295 B2 | 2/2009 | Chaudhri et al. |
| 7,493,573 B2 | 2/2009 | Wagner |
| 7,506,268 B2 | 3/2009 | Jennings et al. ............... 715/786 |
| 7,509,588 B2 | 3/2009 | van Os et al. .................. 715/835 |
| 7,512,898 B2 | 3/2009 | Jennings et al. ............... 715/822 |
| 7,526,738 B2 | 4/2009 | Ording et al. .................. 715/862 |
| 7,546,548 B2 | 6/2009 | Chew et al. |
| 7,546,554 B2 | 6/2009 | Chiu et al. |
| 7,561,874 B2 | 7/2009 | Wang et al. .................... 455/418 |
| 7,603,105 B2 | 10/2009 | Bocking et al. |
| 7,624,357 B2 | 11/2009 | De Bast ......................... 715/828 |
| 7,642,934 B2 | 1/2010 | Scott |
| 7,657,252 B2 | 2/2010 | Futami |
| 7,669,135 B2 | 2/2010 | Cunningham et al. |
| 7,683,889 B2 | 3/2010 | Rimas Ribikauskas et al. |
| 7,719,542 B1 | 5/2010 | Gough et al. |
| 7,720,893 B2 | 5/2010 | Boudreau et al. |
| 7,730,401 B2 | 6/2010 | Gillespie et al. |
| 7,735,021 B2 | 6/2010 | Padawer et al. |
| 7,747,289 B2 | 6/2010 | Wang et al. .................... 455/566 |
| 7,783,990 B2 | 8/2010 | Amadio et al. ................ 715/809 |
| 7,805,684 B2 | 9/2010 | Arvilommi ..................... 715/829 |
| 7,810,038 B2 | 10/2010 | Matsa et al. .................... 715/765 |
| 7,835,729 B2 | 11/2010 | Hyon |
| 7,840,901 B2 | 11/2010 | Lacey et al. |
| 7,853,972 B2 | 12/2010 | Brodersen et al. ............. 725/40 |
| 7,856,602 B2 | 12/2010 | Armstrong |
| 7,917,846 B2* | 3/2011 | Decker et al. .................. 715/234 |
| 7,934,152 B2* | 4/2011 | Krishnamurthy et al. ..... 715/234 |
| 7,940,250 B2 | 5/2011 | Forstall |
| 7,958,457 B1 | 6/2011 | Brandenberg et al. |
| 7,996,789 B2 | 8/2011 | Louch et al. |
| 2001/0024195 A1 | 9/2001 | Hayakawa ..................... 345/173 |
| 2001/0024212 A1 | 9/2001 | Ohnishi ......................... 345/769 |
| 2002/0015024 A1 | 2/2002 | Westerman et al. ........... 345/173 |
| 2002/0015042 A1 | 2/2002 | Robotham et al. ............ 345/581 |
| 2002/0024540 A1 | 2/2002 | McCarthy |
| 2002/0038299 A1 | 3/2002 | Zernik et al. |
| 2002/0054090 A1 | 5/2002 | Silva et al. ..................... 345/747 |
| 2002/0085037 A1 | 7/2002 | Leavitt et al. .................. 345/765 |
| 2002/0188948 A1 | 12/2002 | Florence |
| 2002/0191029 A1* | 12/2002 | Gillespie et al. ............... 345/810 |
| 2003/0014415 A1* | 1/2003 | Weiss et al. .................... 707/10 |
| 2003/0016241 A1 | 1/2003 | Burke ............................ 345/733 |
| 2003/0030664 A1 | 2/2003 | Parry |
| 2003/0048295 A1 | 3/2003 | Lilleness et al. ............... 345/738 |
| 2003/0090572 A1 | 5/2003 | Belz et al. |
| 2003/0169298 A1 | 9/2003 | Ording .......................... 345/810 |
| 2003/0184552 A1 | 10/2003 | Chadha ......................... 345/581 |
| 2003/0184587 A1 | 10/2003 | Ording et al. .................. 345/769 |
| 2003/0200289 A1 | 10/2003 | Kemp et al. ................... 709/221 |
| 2003/0206195 A1 | 11/2003 | Matsa et al. .................... 345/744 |
| 2003/0206197 A1 | 11/2003 | McInerney |
| 2004/0041849 A1 | 3/2004 | Mock et al. |
| 2004/0093582 A1 | 5/2004 | Segura |
| 2004/0103156 A1 | 5/2004 | Quillen et al. ................. 709/206 |
| 2004/0109025 A1 | 6/2004 | Hullot et al. |
| 2004/0121823 A1 | 6/2004 | Noesgaard et al. |
| 2004/0155909 A1 | 8/2004 | Wagner |
| 2004/0177148 A1* | 9/2004 | Tsimelzon, Jr. ................ 709/227 |
| 2004/0205492 A1* | 10/2004 | Newsome .................... 715/501.1 |
| 2004/0215719 A1 | 10/2004 | Altshuler ....................... 709/204 |
| 2004/0221006 A1* | 11/2004 | Gopalan et al. ................ 709/203 |
| 2004/0222975 A1 | 11/2004 | Nakano et al. ................. 345/173 |
| 2005/0005246 A1 | 1/2005 | Card et al. ..................... 715/776 |
| 2005/0024341 A1 | 2/2005 | Gillespie et al. |
| 2005/0026644 A1 | 2/2005 | Lien ............................. 455/550.1 |
| 2005/0039134 A1 | 2/2005 | Wiggeshoff et al. |
| 2005/0057524 A1 | 3/2005 | Hill et al. ....................... 345/173 |
| 2005/0057548 A1 | 3/2005 | Kim ............................... 345/204 |
| 2005/0060664 A1 | 3/2005 | Rogers ........................... 715/810 |
| 2005/0060665 A1 | 3/2005 | Rekimoto ...................... 715/810 |
| 2005/0078804 A1 | 4/2005 | Yomoda |
| 2005/0091609 A1 | 4/2005 | Matthews et al. ............. 715/804 |
| 2005/0097089 A1 | 5/2005 | Nielsen et al. ................. 707/3 |
| 2005/0120142 A1 | 6/2005 | Hall |
| 2005/0134578 A1 | 6/2005 | Chambers et al. ............. 345/184 |
| 2005/0154798 A1 | 7/2005 | Nurmi |
| 2005/0156873 A1 | 7/2005 | Walter et al. |
| 2005/0169527 A1 | 8/2005 | Longe et al. |
| 2005/0210018 A1* | 9/2005 | Singh et al. .................... 707/3 |
| 2005/0229102 A1 | 10/2005 | Watson et al. ................. 715/739 |
| 2005/0250438 A1 | 11/2005 | Makipaa et al. ............... 455/3.06 |

(56) References Cited

U.S. PATENT DOCUMENTS

| | | | |
|---|---|---|---|
| 2005/0251755 A1 | 11/2005 | Mullins et al. | 715/779 |
| 2005/0262448 A1 | 11/2005 | Vronay et al. | 715/767 |
| 2005/0267869 A1* | 12/2005 | Horvitz et al. | 707/2 |
| 2005/0275636 A1 | 12/2005 | Dehlin et al. | 345/173 |
| 2005/0289458 A1 | 12/2005 | Kylmanen | 715/513 |
| 2005/0289476 A1 | 12/2005 | Tokkonen | |
| 2006/0005207 A1 | 1/2006 | Louch et al. | |
| 2006/0026170 A1 | 2/2006 | Kreitler et al. | |
| 2006/0026521 A1 | 2/2006 | Hotelling et al. | |
| 2006/0026536 A1 | 2/2006 | Hotelling et al. | |
| 2006/0051073 A1 | 3/2006 | Jung et al. | |
| 2006/0055662 A1 | 3/2006 | Rimas-Ribikauskas et al. | |
| 2006/0075355 A1 | 4/2006 | Shiono et al. | 715/778 |
| 2006/0080616 A1 | 4/2006 | Vogel et al. | 715/769 |
| 2006/0085763 A1 | 4/2006 | Leavitt et al. | |
| 2006/0105814 A1 | 5/2006 | Monden et al. | |
| 2006/0112335 A1 | 5/2006 | Hofmeister et al. | 715/701 |
| 2006/0117197 A1 | 6/2006 | Nurmi | |
| 2006/0123360 A1 | 6/2006 | Anwar et al. | 715/810 |
| 2006/0129647 A1* | 6/2006 | Kaghazian | 709/206 |
| 2006/0148526 A1 | 7/2006 | Kamiya et al. | |
| 2006/0153531 A1 | 7/2006 | Kanegae et al. | |
| 2006/0168510 A1* | 7/2006 | Bryar et al. | 715/511 |
| 2006/0174211 A1 | 8/2006 | Hoellerer et al. | |
| 2006/0179415 A1* | 8/2006 | Cadiz et al. | 715/838 |
| 2006/0197753 A1 | 9/2006 | Hotelling | 345/173 |
| 2006/0224997 A1* | 10/2006 | Wong et al. | 715/838 |
| 2006/0236266 A1 | 10/2006 | Majava | |
| 2006/0238625 A1 | 10/2006 | Sasaki et al. | |
| 2006/0242145 A1* | 10/2006 | Krishnamurthy et al. | 707/6 |
| 2006/0242596 A1 | 10/2006 | Armstrong | |
| 2006/0242604 A1 | 10/2006 | Wong et al. | |
| 2006/0242607 A1 | 10/2006 | Hudson | |
| 2006/0271864 A1 | 11/2006 | Satterfield et al. | |
| 2006/0271874 A1 | 11/2006 | Raiz et al. | 715/767 |
| 2006/0277460 A1 | 12/2006 | Forstall et al. | 715/513 |
| 2006/0278692 A1 | 12/2006 | Matsumoto et al. | 235/375 |
| 2006/0282786 A1 | 12/2006 | Shaw et al. | |
| 2006/0282790 A1* | 12/2006 | Matthews et al. | 715/767 |
| 2006/0284852 A1 | 12/2006 | Hofmeister et al. | 345/173 |
| 2006/0290661 A1 | 12/2006 | Innanen et al. | |
| 2007/0013665 A1 | 1/2007 | Vetelainen et al. | 345/169 |
| 2007/0022386 A1* | 1/2007 | Boss et al. | 715/764 |
| 2007/0028269 A1 | 2/2007 | Nezu et al. | 725/52 |
| 2007/0030362 A1 | 2/2007 | Ota et al. | 348/239 |
| 2007/0055947 A1 | 3/2007 | Ostojic et al. | 715/800 |
| 2007/0067272 A1 | 3/2007 | Flynt et al. | |
| 2007/0083827 A1* | 4/2007 | Scott et al. | 715/811 |
| 2007/0083911 A1 | 4/2007 | Madden et al. | 725/135 |
| 2007/0101297 A1 | 5/2007 | Forstall et al. | |
| 2007/0124677 A1 | 5/2007 | de los Reyes et al. | 715/705 |
| 2007/0132789 A1 | 6/2007 | Ording et al. | |
| 2007/0150810 A1 | 6/2007 | Katz et al. | |
| 2007/0150830 A1 | 6/2007 | Ording et al. | |
| 2007/0156697 A1 | 7/2007 | Tsarkova | 707/9 |
| 2007/0157089 A1 | 7/2007 | van Os et al. | |
| 2007/0177803 A1 | 8/2007 | Elias et al. | 382/188 |
| 2007/0177804 A1 | 8/2007 | Elias et al. | |
| 2007/0180395 A1 | 8/2007 | Yamashita et al. | |
| 2007/0189737 A1 | 8/2007 | Chaudhri et al. | 386/125 |
| 2007/0192741 A1 | 8/2007 | Yoritate et al. | |
| 2007/0200713 A1 | 8/2007 | Weber et al. | |
| 2007/0204218 A1 | 8/2007 | Weber et al. | |
| 2007/0233695 A1 | 10/2007 | Boudreau et al. | |
| 2007/0243862 A1 | 10/2007 | Coskun et al. | 455/418 |
| 2007/0245250 A1 | 10/2007 | Schechter et al. | 715/760 |
| 2007/0260999 A1* | 11/2007 | Amadio et al. | 715/804 |
| 2007/0266011 A1* | 11/2007 | Rohrs et al. | 707/3 |
| 2007/0266342 A1* | 11/2007 | Chang et al. | 715/810 |
| 2007/0288860 A1 | 12/2007 | Ording et al. | 715/779 |
| 2007/0288862 A1 | 12/2007 | Ording | 715/788 |
| 2007/0300160 A1* | 12/2007 | Ferrel et al. | 715/744 |
| 2008/0001924 A1 | 1/2008 | de los Reyes et al. | |
| 2008/0005703 A1 | 1/2008 | Radivojevic et al. | |
| 2008/0034309 A1 | 2/2008 | Louch et al. | |
| 2008/0059906 A1* | 3/2008 | Toki | 715/810 |
| 2008/0082930 A1 | 4/2008 | Omernick et al. | |
| 2008/0122796 A1 | 5/2008 | Jobs et al. | 345/173 |
| 2008/0125180 A1 | 5/2008 | Hoffman et al. | |
| 2008/0132252 A1 | 6/2008 | Altman et al. | |
| 2008/0139176 A1 | 6/2008 | Kim | |
| 2008/0161045 A1 | 7/2008 | Vuorenmaa | |
| 2008/0168075 A1 | 7/2008 | Kamiyabu | |
| 2008/0168367 A1 | 7/2008 | Chaudhri et al. | 715/764 |
| 2008/0168478 A1 | 7/2008 | Platzer et al. | |
| 2008/0171555 A1 | 7/2008 | Oh et al. | |
| 2008/0182598 A1 | 7/2008 | Bowman | |
| 2008/0182628 A1 | 7/2008 | Lee et al. | 455/566 |
| 2008/0184052 A1 | 7/2008 | Itoh et al. | |
| 2008/0184112 A1 | 7/2008 | Chiang et al. | 715/700 |
| 2008/0189108 A1 | 8/2008 | Atar | |
| 2008/0201452 A1 | 8/2008 | Athas et al. | |
| 2008/0216017 A1 | 9/2008 | Kurtenbach et al. | |
| 2008/0259045 A1 | 10/2008 | Kim et al. | |
| 2008/0268882 A1 | 10/2008 | Moloney | |
| 2008/0310602 A1 | 12/2008 | Bhupati | |
| 2009/0007017 A1 | 1/2009 | Anzures et al. | 715/835 |
| 2009/0064055 A1 | 3/2009 | Chaudhri et al. | 715/863 |
| 2009/0128581 A1 | 5/2009 | Brid et al. | |
| 2009/0178008 A1 | 7/2009 | Herz et al. | |
| 2009/0199128 A1 | 8/2009 | Matthews et al. | 715/799 |
| 2009/0222765 A1 | 9/2009 | Ekstrand | |
| 2009/0249252 A1 | 10/2009 | Lundy et al. | |
| 2009/0254799 A1 | 10/2009 | Unger | |
| 2009/0288032 A1 | 11/2009 | Chang et al. | |
| 2009/0295753 A1 | 12/2009 | King et al. | |
| 2010/0095238 A1 | 4/2010 | Baudet | |
| 2010/0105454 A1 | 4/2010 | Weber et al. | |
| 2010/0169357 A1* | 7/2010 | Ingrassia et al. | 707/769 |
| 2010/0179911 A1 | 7/2010 | Lorch et al. | |
| 2010/0318709 A1 | 12/2010 | Bell et al. | |
| 2011/0007009 A1 | 1/2011 | Ishihara et al. | |

FOREIGN PATENT DOCUMENTS

| | | | |
|---|---|---|---|
| CN | 1940833 | 4/2007 | |
| EP | 0 322 332 A2 | 6/1989 | G06F 3/023 |
| EP | 0 626 635 A2 | 11/1994 | |
| EP | 0 689 134 A1 | 12/1995 | G06F 9/44 |
| EP | 0 844 553 A1 | 5/1998 | |
| EP | 1 143 334 A2 | 10/2001 | |
| EP | 1 231 763 | 8/2002 | H04M 1/725 |
| EP | 1 517 228 A2 | 3/2005 | G06F 3/033 |
| EP | 1 744 242 | 1/2007 | |
| FR | 2 819 675 A1 | 7/2002 | |
| GB | 2 329 813 A | 3/1999 | |
| JP | 09 073381 | 3/1997 | |
| JP | 2000 163031 | 6/2000 | |
| JP | 2000 163193 | 6/2000 | |
| JP | 2002 062966 | 2/2002 | |
| JP | 2002 149616 | 5/2002 | |
| JP | 2004 070492 | 3/2004 | |
| JP | 2004 164242 | 6/2004 | |
| JP | 2004 341868 | 12/2004 | |
| JP | 2004 341888 | 12/2004 | |
| JP | 2005 115896 | 4/2005 | |
| JP | 2005309933 A | 11/2005 | |
| JP | 2005 352924 | 12/2005 | |
| JP | 2005 352943 | 12/2005 | |
| KR | 2002-0010863 | 2/2002 | |
| WO | WO 99/28815 | 6/1999 | |
| WO | WO 99/38149 A1 | 7/1999 | |
| WO | WO 00/08757 A | 2/2000 | H03J 1/00 |
| WO | WO 01/16690 A2 | 3/2001 | G06F 3/033 |
| WO | WO 01/57716 | 8/2001 | G06F 17/00 |
| WO | WO 02/08881 | 1/2002 | |
| WO | WO 02/13176 | 2/2002 | |
| WO | WO 03/107168 A1 | 12/2003 | G06F 3/023 |
| WO | WO 2004/063862 | 7/2004 | |
| WO | WO 2005/041020 | 5/2005 | |
| WO | WO 06/020304 | 2/2006 | |
| WO | WO 2006/019639 A2 | 2/2006 | |
| WO | WO 2006/020305 A2 | 2/2006 | |
| WO | WO 2006/036069 | 4/2006 | |

(56) References Cited

FOREIGN PATENT DOCUMENTS

| WO | WO 2006/037545 A2 | 4/2006 | |
|---|---|---|---|
| WO | WO 2007/031816 A1 | 3/2007 | |
| WO | WO 2007/032972 | 3/2007 | |
| WO | WO 2007/069835 A1 | 6/2007 | .............. G06F 3/041 |
| WO | WO 2007/094894 A2 | 8/2007 | |

OTHER PUBLICATIONS tuaw.com, "Springboard Scrolling," new page dot feature, Oct. 9, 2007, http://www.tuaw.com/gallery/springboard-scrolling/431347/.
tuaw.com, "Springboard Scrolling," mid-scroll, Oct. 9, 2007, http://www.tuaw.com/photos/springboard-scrolling/731348/.
tuaw.com. "Springboard Scrolling," mostly unpopulated page, Oct. 9, 2007, http://www.tuaw.com/photos/springboard-scrolling/431349/.
tuaw.com, "TUAW Hack: Mess with Your iPhone Settings," Dec. 18, 2007, http://www/tuaw.com/tag/SpringBoard/.
tuaw.com, "1.1.1 iPhone Multipage Springboard Hack," posted Oct. 9, 2007, http://www.tuaw.com/2007/10/09/1-1-1-iphone-multipage-springboard-hack/.
International Preliminary Report on Patentability dated Jul. 15, 2010, received in International Application No. PCT/US2009/030225, which corresponds to U.S. Appl. No. 12/242,851.
International Preliminary Report on Patentability dated Mar. 18, 2010, received in International Application No. PCT/US2008/074625, which corresponds to U.S. Appl. No. 11/849,938, 7 pages.
Office Action dated Mar. 30, 2010, received in Chinese Application for Invention No. 200680053441.1, which corresponds to U.S. Appl. No. 11/459,602, 5 pages.
Examiner's Report dated Apr. 20, 2010, received in Australian Patent Application No. 2009204252, which corresponds to U.S. Appl. No. 12/242,851.
Final Office Action dated May 5, 2010, received in U.S. Appl. No. 12/364,470.
Office Action dated Aug. 11, 2010, received in U.S. Appl. No. 11/850,011.
Office Action dated Aug. 12, 2010, received in Canadian Application No. 2633759, which corresponds to U.S. Appl. No. 11/459,602.
Office Action dated Sep. 2, 2010, received in U.S. Appl. No. 12/364,470.
Office Action dated Oct. 12, 2010, received in U.S. Appl. No. 11/849,938.
Office Action dated Oct. 15, 2010, received in European Application No. 08 829 660.3, which corresponds to U.S. Appl. No. 11/849,938.
Anonymous, "Asus Eee PC Easy Mode Internet Tab Options," asuseeehacks.blogspot.com, Nov. 10, 2007, 33 pages, http://asuseeehacks.blogspot.com/2007/11/asus-eee-pc-user-interface-tour.html.
Invitation to Pay Additional Fees dated Nov. 16, 2009, received in International Patent Application No. PCT/US2009/030225, which corresponds to U.S. Appl. No. 12/242,851.
CNET, "Video: Create custom widgets with Web Clip," CNET News, Aug. 8, 2006, 3 pages, http://news.cnet.com/1606-2-6103525.html.
FondantFancies, "Dash Clipping: Don't wait for Mac OS X 10.5 Leopard," fondantfancies.com, Aug. 8, 2006, 9 pages, http://www.fondantfancies.com/blog/3001239/.
Macworld, "Whip up a widget," Macworld.com., Sep. 23, 2005, 5 pages, http://www.macworld.com/article/46622/2005/09/octgeekfactor.html.
Macworld, "First Look: Leopard first looks: Dashboard," Aug. 9, 2006, 3 pages, http://www.macworld.com/article/52297/2005/08/leodash.html.
Opera Software, "Welcome to Widgetize," Copyright © 2006 Opera Software ASA, 1 page, http://widgets.opera.com/widgetize.
Examiner's Report dated Apr. 2, 2009, received in the Canadian patent application which corresponds to U.S. Appl. No. 11/459,602.
Agarawala et al. "Database Compendex/EI," Engineering Information, Inc., Apr. 27, 2006, 1 page.

Agarawala et al., "Keepin' it Real: Pushing the Desktop Metaphor with Physics, Piles and the Pen," CHI Proceedings 2006, Apr. 22-27, 2006, Montréal, Québec, Canada, pp. 1283-1292.
Anonymous, "Desktop Icon Toy—History," Oct. 8, 2009, 2 pages, http://www.idesksoft.com/history.html.
Berka, J., "iFuntastic 3 Opens Up New iPhone Functionality," ars technica, Aug. 30, 2007, http://arstechnica.com/journals/apple.ars/2007/08/30/ifuntastic-3-opens-up-new-iphone-functionality.
Chartier, D., "iPhone 1.1.3 Video Brings the Proof," ars technica, Dec. 30, 2007, http://arstechnica.com/journals/apple.are/2007/12/30/iphone-1-1-3-video-brings-the-proof.
Domshlak, C., et al. "Preference-Based Configuration of Web Page Content," Proceedings of the 17th Int'l Joint Conf. on Artificial Intelligence (IJCAI), pp. 1451-1456, Seattle, WA.
Edwards, A., "iPhone 1.1.3 Firmware Feature Gallery," Gear Live, Dec. 28, 2007, http://www.gearlive.com/news/article/q407-iphone-113-firmware-feature-gallery/.
iPhone Dev Wiki, "IPhone Customization," http://iphone.fiveforty.net/wiki/index.php/Iphone_Customization.
iPhone Hacks, iPhone Firmware 1.1.1: Multi-Page SpringBoard Hack.
iPhone Hacks, "SummerBoard for iPhone OS v1.1.1: iPhone Hack Enables Scrolling of iPhone's Home Screen," http://www.iphonehacks.com/2007/10/summerboard-v3.html.
iPhone Info, "Modifying the iPhone SpringBoard," http://iphoneinfo.ca/modifying-the-iphone-springboard.
Jazzmutant, "Jazzmutant Lemur," printed Nov. 16, 2005, 3 pages, http://64.233.167.104/search?q=cache:3g4wFSaZiXIJ :www.nuloop.c.
Jazzmutant, "The Lemur: Multitouch Control Surface", printed Nov. 16, 2005, 3 pages http://64233.167.104/search?q=cache:j0_nFbNVzOcJ:www.cycling7.
Microsoft, "Right-Clicking with a Pen," microsoft.com, Nov. 7, 2002, 3 pages, http://www.microsoft.com/windowsxp/using/tabletpc/learnmore/rightclick.mspx.
MountFocus Information Systems, "An Onscreen Virtual Keyboard: touchscreen, kiosk and Windows compatible," printed Dec. 19, 2007, 3 pages, http://www.virtual-keyboard.com.
Sadun, E., "Erica's Documentation: Applications and Utilities for the iPhone and iPod Touch," Copyright 2007, http://ericasadun.com/ftp/Deprecated/Documentation/Manual-0.04.pdf.
Vrba, J., "iPhone Customizations and Applications," Ezine Articles, http://ezinearticles.com/?iPhone-Customizations-and-Applications& id=815807&opt=print.
Wildarya, "iDesksoft Desktop Icon Toy v2.9," Oct. 16, 2007, 4 pages, http://www.dl4all.com/2007/10/16/idesksoft_desktop_icon_toy_v2.9.html.
International Search Report and Written Opinion dated Feb. 25, 2010, received in International Application No. PCT/US2009/030225, which corresponds to U.S. Appl. No. 12/242,851.
Office Action dated Sep. 14, 2009, received in Australian Patent Application 2009100812, which corresponds to U.S. Appl. No. 11/459,602.
Office Action dated Sep. 14, 2009, received in Australian Patent Application No. 2009100813, which corresponds to U.S. Appl. No. 11/459,602.
Office Action dated Dec. 10, 2009, received in Canadian Application No. 2,633,759, which corresponds to U.S. Appl. No. 11/459,602.
Office Action dated Oct. 27, 2009, received in German Patent Application No. 11 2006 003 600.9, which corresponds to U.S. Appl. No. 11/459,602.
Office Action dated Oct. 13, 2008, received in European Application No. 06 846 840.4, which corresponds to U.S. Appl. No. 11/459,602.
International Search Report and Written Opinion for International Application No. PCT/US2008/050431, mailed Jun. 17, 2008.
Office Action dated Nov. 12, 2010, received in Chinese Application for Invention No. 200680053441.1, which corresponds to U.S. Appl. No. 11/459,602.
Final Office Action dated Dec. 1, 2010, received in U.S. Appl. No. 11/850,011.
Office Action dated Nov. 26, 2010, received in European Patent Application No. 09 700 333.9, which corresponds to U.S. Appl. No. 12/242,851.

(56) References Cited

OTHER PUBLICATIONS

Andrew's Widgets, "Developing Dashboard Widgets—What the Heck is a Widget," http://andrew.hedges.name/widgets/dev/, printed Jan. 25, 2008, 9 pages.
Designing Interfaces.com, "Animated Transition," http://designinginterfaces.com/Animated_Transition, printed Oct. 16, 2006, 2 pages.
Apple.com, "Tiger Developer Overview Series-Developing Dashboard Widgets," http://developer.apple.com/macosx/dashboard.html, printed Jun. 23, 2006, 9 pages.
Apple Computer, Inc., "Dashboard Tutorial," Apple Computer, Inc. © 2004,2006, 24 pages.
Hesseldahl, A., "An App the Mac can Brag About," Forbes.com, http://www.forbes.com/2003/12/15/cx_ah_1215tentech_print.html, Dec. 15, 2003, 2 pages.
Mello, Jr., J.,"Tiger's Dashboard Brings Widgets to New Dimension," http://www.nacnewsworld.com/story/42630.html, Mac New World, printed Jun. 23, 2006, 3 pages.
International Search Report and Written Opinion for International Application PCT/US2007/077643, mailed May 8, 2008.
Invitation to Pay Additional Fees dated Jun. 27, 2008, received in International Application No. PCT/US2008/050430, which corresponds to U.S. Appl. No. 11/969,809.
International Search Report and Written Opinion dated Sep. 1, 2008, received in International Application No. PCT/US2008/050430, which corresponds to U.S. Appl. No. 11/969,809.
Notice of Allowance dated Feb. 18, 2011, received in U.S. Appl. No. 11/850,011.
Office Action dated Mar. 4, 2011, received in European Application No. 07 814 689.1, which corresponds to U.S. Appl. No. 11/850,638.
Office Action dated Mar. 14, 2011, received in U.S. Appl. No. 11/969,809.
Office Action dated Apr. 15, 2011, received in U.S. Appl. No. 12/242,851.
Examiner's Report dated May 18, 2011, received in Australian Patent Application No. 2009204252, which corresponds to U.S. Appl. No. 12/242,851.
Office Action dated Apr. 18, 2011, received in U.S. Appl. No. 12/217,029.
Office Action dated Nov. 13, 2009 received in U.S. Appl. No. 12/364,470.
Office Action dated Mar. 4, 2011, received in U.S. Appl. No. 12/364,470.
Final Office Action dated May 27, 2011, received in U.S. Appl. No. 11/849,938.
Office Action dated Oct. 29, 2010, received in Australian Patent Application No. 2008296445, which corresponds to U.S. Appl. No. 11/849,938.
Final Office Action dated Jul. 14, 2011, received in U.S. Appl. No. 11/969,809 (Platzer).
Office Action dated Jun. 10, 2011, received in European Patent Application No. 09 700 333.9, which corresponds to U.S. Appl. No. 12/242,851 (Herz).
Final Office Action dated Oct. 19, 2011, received in U.S. Appl. No. 12/364,470 (van Os).
Office Action dated Aug. 24, 2011, received in Chinese Patent Application No. 200880112570.2, which corresponds to U.S. Appl. No. 11/849,938 (Chaudhri).
Office Action dated Aug. 8, 2011, received in Korean Patent Application No. 10-2010-7007258, which corresponds to U.S. Appl. No. 11/849,938 (Chaudhri).
Extended European Search Report dated Feb. 1, 2013, received in European Patent Application No. 12177813.8, which corresponds to U.S. Appl. No. 11/850,011, 6 pages (Forstall).
European Search Report dated Jan. 16, 2013, received in European Patent Application No. 12194312.0, which corresponds to U.S. Appl. No. 12/242,851, 8 pages (Herz).
European Search Report dated Jan. 16, 2013, received in European Patent Application No. 12194315.3, which corresponds to U.S. Appl. No. 12/242,851,7 pages (Herz).
European Search Report dated Dec. 18, 2012, received in European Patent Application No. 12189764.9, which corresponds to U.S. Appl. No. 11/849,938, 5 pages (Chaudhri).
Final Office Action dated Feb. 15, 2013, received in U.S. Appl. No. 11/850,010, 21 pages (Omernick).
Notice of Allowance dated Apr. 26, 2013, received in U.S. Appl. No. 11/969,809, 23 pages (Platzer).
Final Office Action dated May 10, 2013, received in U.S. Appl. No. 12/242,851, 33 pages (Herz).
Final Office Action dated Jan. 30, 2013, received in U.S. Appl. No. 11/849,938, 38 pages (Chaudhri).
Office Action dated Feb. 20, 2013, received in Chinese Patent Application, which corresponds to U.S. Appl. No. 11/849,938, 5 pages (Chaudhri).
Decision to Grant dated May 31, 2013, received in Japanese Patent Application No. 2010-524102, which corresponds to U.S. Appl.n No. 11/849,938, 3 pages (Chaudhri).
Office Action dated Jan. 30, 2013, received in Koran Patent Application No. 1020107007258, which corresponds to U.S. Appl. No. 11/849,938, 4 pages (Chaudhri).
Notice of Allowance dated Apr. 29, 2013, received in U.S. Appl. No. 13/104,903, 8 pages (Forstall).
Office Action dated Feb. 20, 2013, received in U.S. Appl. No. 13/104,911, 25 pages (Forstall).
Notice of Allowance dated Jun. 10, 2013, received in U.S. Appl. No. 13/104,911, 6 pages (Forstall).
Apple, "Welcome to Tiger," copyright © 2005 Apple Computer, Inc., 32 pages, http://manuals.info.apple.com/en/Welcome_to_Mac_OS_X_v10.4_Tiger.pdf.
Chang et al., "Animation: From Cartoons to the User Interface," UIST '93 Conference Proceedings, Atlanta, GA, Nov. 1993, 12 pages.
delltech, "Working with Graphics," Windows XP: The Complete Reference, Chapter 18, Apr. 5, 2005, 4 pages.
Dodge et al., "Microsoft Office Excel 2003 Office Manual," Microsoft Press, Jul. 12, 2004, vol. 1, p. 66-68, Unable to Locate English Translation.
Widgipedia, "I Need a Bog and a Forum Please?" 2 pages, printed Oct. 19, 2006, http://www.widgipedia.com/widgets/details/adni18/hyalo-weather_27.html.
International Search Report and Written Opinion dated Jul. 8, 2008 for International Application No. PCT/US2007/077639, which corresponds to U.S. Appl. No. 11/850,010, 11 pages (Omernick).
International Search Report and Written Opinion dated Nov. 27, 2009, received in International Application No. PCT/US2008/074341, which corresponds to U.S. Appl. No. 11/850,005, 25 pages (Chaudhri).
Office Action dated May 2, 2011, received in U.S. Appl. No. 11/850,010, 12 pages (Omernick).
Final Office Action dated Oct. 17, 2011, received in U.S. Appl. No. 11/850,010, 11 pages (Omernick).
Office Action dated May 16, 2012, received in U.S. Appl. No. 11/850,010, 12 pages (Omenick).
Office Action dated Jan. 18, 2012, received in Chinese Patent Application No. 200780041309.3, which corresponds to U.S. Appl. No. 11/850,011, 15 pages (Forstall).
Summons to attend oral proceedings dated Dec. 1, 2011, received in European Patent Application No. 07814689.1, which corresponds to U.S. Appl. No. 11/850,011, 6 pages (Forstall).
Final Office Action dated Dec. 12, 2011, received in U.S. Appl. No. 12/242,851, 17 pages (Herz).
Notification of Acceptance dated Oct. 17, 2011, received in Australian Patent Application No. 2009204252, which corresponds to U.S. Appl. No. 12/242,851, 3 pages (Herz).
Office Action dated Oct. 21, 2011, received in Australian Patent Application No. 2011101194, which corresponds to U.S. Appl. No. 12/242,851, 24 pages (Herz).
Certification of Australian Innovation Patent No. 2011101194 dated Mar. 2, 2012, which corresponds to U.S. Appl. No. 12/242,851, 4 pages (Herz).
Office Action dated Nov. 30, 2011, received in Chinese Patent Application No. 200980000229.2, which corresponds to U.S. Appl. No. 12/242,851, 24 pages (Herz).

(56) References Cited

OTHER PUBLICATIONS

Office Action dated Jan. 25, 2012, received in U.S. Appl. No. 12/217,029, 24 pages (Anzures).
Office Action dated Dec. 14, 2011, received in U.S. Appl. No. 11/849,938, 30 pages (Chaudhri).
Notice of Acceptance dated Dec. 14, 2011, received in Australian Patent Application No. 2008296445, which corresponds to U.S. Appl. No. 11/849,938, 3 pages (Chaudhri).
Office Action dated Feb. 13, 2012, received in Japanese Patent Application No. 2010-524102, which corresponds to U.S. Appl. No. 11/849,938, 2 pages (Chaudhri).
ISO 9241-10:1996 Ergonomic requirements for office work with visual display terminals (VDTs)—Part 10: Dialogue principles, International Standard—ISO, Zuerich, CH, vol. 9241-10, May 1, 1996, 18 pages.
ISO 9241-11:1998 Ergonomic requirements for office work with visual display terminals (VDTs)—Part 11: Guidance on usability, International Standard—ISO, Zuerich, CH, vol. 9241-11, Jan. 1, 1998, 28 pages.
ISO 9241-12:1998 Ergonomic requirements for office work with visual display terminals (VDTs)—Part 12: Presentation of information, International Standard—ISO, Zuerich, CH, vol. 9241-12, Dec. 1, 1998, 52 pages.
RealNetworks, "Transition Effects," RealNetworks Production Guide, 2001, http://service.real.com/help/library/guides/productionguidepreview/HTML/htmfiles/transit.htm, 21 pages.
Office Action dated Jul. 2, 2013, received in Chinese Patent Application No. 200780041309.3, which corresponds to U.S. Appl. No. 11/850,011 12 pages (Forstall).
Office Action dated Jul. 2, 2013, received in Chinese Patent Application No. 200980000229.2, which corresponds to U.S. Appl. No. 12/242,851, 4 pages (Herz).
Grant Notice dated Jun. 20, 2013, received in European Patent Application No. 09 700 333.9, which corresponds to U.S. Application No. 12/242,851, 7 pages(Herz).
Office Action dated Aug. 19, 2013, received in U.S. Appl. No. 12/217,029, 10 pages (Anzures).
Office Action dated Aug. 12, 2013, received in Australian Patent Application No. 2012202140, which corresponds to U.S. Appl. No. 11/849,938, 2 pages (Chaudhri).
Office Action dated Aug. 2, 2013, received in European Patent Application No. 08 829 660.3, which corresponds to U.S. Appl. No. 11/849,938, 7 pages (Chaudri).
Summons to attend oral arguments dated Aug. 30, 2013, received in European Patent Application No. 08798713.7, which corresponds to U.S. Appl. No. 11/850,005, 15 pages (Chaudhri).
Apple, iPhone User's Guide, Jun. 2007, Appie Inc., 137 pages.
Cerulean Studios, "Trillian Online User Manual," 2006, http://www.ceruleanstudios.com/support/manual.php?hchap=4&hsub=1&hsect=5.
CNET, "bounding box," cnet.com, downloaded Dec. 29, 2008, 1 page, http://www.cnet.com/Resources/Info/Glossary/Terms/boundingbox.html.
"Dearman et al, Rendezvousing with Location-Aware Devices: Enhancing Social Coordination," Interacting with Computers, vol. 17, Issue 5, Sep. 2005, pp. 542-566, http://www.dgp.toronto.edu/~earman/publications/dearman_IWC05.pdf.
emesene forum, "Autocomplete plugin," Jun. 20, 2008, http://emeseme.org/smf/index.php?topic=1276.0, 5 pages.
Foxit, "Foxit Reader v. 1.3 Feature Description," Foxit Software Company, 2008, http://www.foxitsoftware.com/pdf/reader_2/verhiStory.htm, 4 pages.
Pocketgear.com, "Software Keyboards: Effy-Japanese (Eng/Jp) 4.0," updated Sep. 23, 2008, http://classic.pocketgear.com/software_detail. asp?id =9115.
Potter, "Graffiti Smilies," PalmInfocenter Forums, Feb. 9, 2003, 6 pages, 2005, http://www.palminfocenter.com/forum/viewtopic.php?t=11307.
Sharewareconnection, "Handy Animated Ernoticons," Jul. 2007, http://wwwsharewareconnection.com/handy-animated-emoticons.htm, 3 pages.
YouTube, "SummerBoard 3.0a9 for iPhone,".
Office Action dated Oct. 24, 2013, received in U.S. Appl. No. 11/850,010, 19 pages (Omernick).
Examination Report dated Nov. 28, 2013, received in Australian Patent Application, No. 2009204252, which corresponds to U.S. Appl. No. 12/242,851, 7 pages (Herz).
Office Action dated Nov. 19, 2013, received in Australian Patent Application No. 2012200475, which corresponds to U.S. Appl. No. 12/242,851, 4 pages (Herz).
Office Action dated Oct. 8, 2013, received in European Patent Application No. 12 194 312.0, which corresponds to U.S. Appl. No. 12/242,851, 5 pages (Herz).
Office Action dated Oct. 8, 2013, received in European Patent Application No. 12 194 315.3, which corresponds to U.S. Appl. No. 12/242,851, 5 pages, (Herz).
Office Action dated Aug. 26, 2011, received in U.S. Appl. No. 12/274,346 (Moore).
Final Office Action dated Mar. 14, 2012, received in U.S. Appl. No. 12/274,346, 49 pages (Moore).
Notice of Allowance dated Mar. 12, 2013, received in U.S. Appl. No. 12/274,346, 19 pages (Moore).
Notice of Allowance dated Jul. 17, 2013, received in U.S. Appl. No. 12/274,346, 12 pages (Moore).
Office Action dated Dec. 5, 2012, received in Chinese Patent Application No. 200980152822.9, which corresponds to U.S. Appl. No. 12/274,346, 10 pages (Moore).
Office Action dated Oct. 21, 2013, received in Chinese Patent Application No. 200980152822.9, which corresponds to U.S Appl. No. 12/274,346, 2 pages (Moore).
Office Action dated Jan. 25, 2013, received in Japanese Patent Patent Application No. 2011537452, which corresponds to U.S. Appl. No. 12/274,346, 5 pages (Moore).
Grant of Application dated Jun. 14, 2013, received in Japanese Patent Application No. 2011-537452, which corresponds to U.S. Appl. No. 12/274,346, 4 pages (Moore).
Office Action dated Jan. 17, 2013, received in Korean Patent Application No. 10 2011 7014104, which corresponds to U.S. Appl. No. 12/274,346, 4 pages (Moore).
Notice of Allowance dated Aug. 29, 2013, received in Korean Patent Application No. 10 2011 7014104, which corresponds in U.S. Appl. No. 12/274,346, 2 pages (Moore).
Office Action dated Aug. 31, 2011, received in U.S. Appl. No. 12/365,887 (Moore).
Final Office Action dated Feb. 29, 2012, received in U.S. Appl. No. 12/365,887 (Moore).
Notice of Allowance dated May 23, 2012, received in U.S. Appl. No. 12/365,887, 5 pages (Moore).
Office Action dated Nov. 10, 2011, received in U.S. Appl. No. 12/365,888 (Moore).
Notice of Allowance dated Oct. 10, 2013, received in U.S. Appl. No. 11/849,938, 35 pages (Chaudhri).
Notice of Allowance dated Nov. 20, 2013, received in Korean Patent Application No. 2010 7007268, which corresponds to U.S. Appl. No. 11/849,938, 2 pages (Chaudhri).
Office Action dated Oct. 25, 2013, received in Korean Patent Application No. 2010 7007258, which corresponds to U.S. Appl. No. 11/849,938, 4 pages (Chaudhri).
Office Action dated Oct. 24, 2013, received in U.S. Appl. No. 11/850,005, 12 pages (Chaudhri).
Cha, B., "HTC Touch (Sprint)," CNET Reviews, Nov. 6, 2007, http://web.archive.org/web/20071106065114/http://reviews.cnet.com/smartphones/htc-touch-sprint/4505-6452_7-3267123.html, 10 pages.
Gade, L., "HTC Touch (Sprint)—MobileTechReview," Smartphone Reviews by Mobile Tech Review, Nov. 2, 2007, http://www.mobiletechreview.com/phones/HTC-Touch.htm, 7 pages.
SnapFiles "Dexpot," SnapFiles.com, Oct. 10, 2007, 3 pages.
Zhang et al., "An Ergonomics Study of Menu-Operation on Mobile Phone Interface," In Proceedings of the Workshop on Intelligent Information Technology Application, Dec. 2007, 5 pages.

(56) References Cited

OTHER PUBLICATIONS

Office Action dated Nov. 1, 2012, received in Chinese Patent Application No. 200780041309.3, which corresponds to U.S. Appl. No. 11/850,011, 5 pages (Forstall).

Office Action dated Sep. 20, 2012, received in U.S. Appl. No. 12/242,851, 21 pages (Herz).

Office Action dated Oct. 26, 2012, received in Chinese Patent Application No. 200980000229.2, which corresponds to U.S. Appl. No. 12/242,851, 22 pages (Herz).

Summons to oral proceedings dated Sep. 21, 2012, received in European Patent Application No. 09700333.9, which corresponds to U.S. Appl. No. 12/242,851, 4 pages (Herz).

Final Office Action dated Oct. 5, 2012, received in U.S. Appl. No. 12/217,029, 32 pages (Anzures).

Office Action dated Oct. 26, 2012, received in Japanese Patent Application No. 2010-524102, which corresponds to U.S Appl. No. 11/849,939, 4 pages (Chaudhri).

Office Action dated Nov. 13, 2012, received in U.S. Appl. No. 13/104,903, 21 pages, (Forstall).

Final Office Action dated Sep. 14, 2012, received in U.S. Appl. No. 11/850,005, 22 pages (Chaudhri).

Decision to Grant dated Aug. 6, 2012, received in Chinese Pantent Application No. 200880110709.X, which corresponds to U.S. Appl. No. 11/850,005, 2 pages (Chaudhri).

* cited by examiner

7000

```
┌─────────────────────────────────────────────────────────────────────┐
│ Display, on a touch screen display on a portable multifunction      │
│ device, an icon for a web-clip widget. The web-clip widget          │
│ corresponds to a user-specified area of a web page 7002             │
│                                                                     │
│  ┌───────────────────────────────────────────────────────────────┐  │
│  │        Display the icon in a menu or list of icons 7004       │  │
│  └───────────────────────────────────────────────────────────────┘  │
│                                                                     │
│  ┌───────────────────────────────────────────────────────────────┐  │
│  │ The user-specified area was previously selected by translating │  │
│  │      and scaling a displayed portion of the web page 7006      │  │
│  └───────────────────────────────────────────────────────────────┘  │
│                                                                     │
│  ┌───────────────────────────────────────────────────────────────┐  │
│  │ The user-specified area was previously selected by centering   │  │
│  │      and enlarging a displayed portion of the web page 7008    │  │
│  └───────────────────────────────────────────────────────────────┘  │
└─────────────────────────────────────────────────────────────────────┘
                                   │
                                   ▼
┌─────────────────────────────────────────────────────────────────────┐
│                  Detect an activation of the icon 7010              │
│  ┌───────────────────────────────────────────────────────────────┐  │
│  │   Detect a finger gesture (e.g., a tap gesture) on the icon   │  │
│  │                            7012                                │  │
│  └───────────────────────────────────────────────────────────────┘  │
└─────────────────────────────────────────────────────────────────────┘
                                   │
                                   ▼
┌─────────────────────────────────────────────────────────────────────┐
│  In response to detecting activation of the icon, display the       │
│          user-specified area of the web page 7014                   │
└─────────────────────────────────────────────────────────────────────┘
```

Figure 7H

WEB-CLIP WIDGETS ON A PORTABLE MULTIFUNCTION DEVICE

RELATED APPLICATIONS

This application claims priority to U.S. Provisional Patent Application Nos. 60/937,993, "Portable Multifunction Device," filed Jun. 29, 2007; 60/946,712, "Web-Clip Widgets on a Portable Multifunction Device," filed Jun. 27, 2007; 60/879,469, "Portable Multifunction Device," filed Jan. 8, 2007; 60/883,805, "Web-Clip Widgets on a Portable Multifunction Device," filed Jan. 7, 2007; and 60/879,253, "Portable Multifunction Device," filed Jan. 7, 2007. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; (11) U.S. Provisional Patent Application No. 60/824,769, "Portable Multifunction Device," filed Sep. 6, 2006; and (12) U.S. patent application Ser. No. 11/850,011, "Web Clip Widgets on a Portable Multifunction Device," filed Sep. 4, 2007. All of these applications are incorporated by reference herein in their entirety.

TECHNICAL FIELD

The disclosed embodiments relate generally to portable electronic devices, and more particularly, to creating widgets for displaying specified areas of web pages (i.e., creating web-clip widgets) on portable multifunction devices.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of pushbuttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This may prevent a user interface from being configured and/or adapted by either an application running on the portable device or by users. When coupled with the time consuming requirement to memorize multiple keyسequences and menu hierarchies, and the difficulty in activating a desired pushbutton, such inflexibility is frustrating to most users.

As a result of the small size of display screens on portable electronic devices, frequently only a portion of a web page of interest to a user can be displayed on the screen at a given time. Furthermore, the scale of display may be too small for comfortable or practical viewing. Users thus will frequently need to scroll and to scale a web page to view a portion of interest each time that they access the web page. However, the limitations of conventional user interfaces can cause this scrolling and scaling to be awkward to perform.

Accordingly, there is a need for portable multifunction devices with more transparent and intuitive user interfaces for creating widgets for displaying specified areas of web pages (i.e., for creating web-clip widgets) that are easy to use, configure, and/or adapt.

SUMMARY

The above deficiencies and other problems associated with user interfaces for portable devices are reduced or eliminated by the disclosed portable multifunction device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In one aspect of the invention, a computer-implemented method for use at a portable multifunction device with a touch screen display includes displaying a web page or portion thereof on the touch screen display. An activation of an options icon is detected. In response, a plurality of icons including a web-clip widget creation icon is displayed. An activation of the web-clip widget creation icon is detected; in response, a web-clip widget is created corresponding to the displayed web page or portion thereof.

In another aspect, a graphical user interface on a portable multifunction device with a touch screen display includes a web page or portion thereof, an options icon, and a plurality of icons including a web-clip widget creation icon. In response to detecting activation of the options icon, the plurality of icons including the web-clip widget creation icon is displayed. In response to detecting activation of the web-clip widget creation icon, a web-clip widget is created corresponding to the web page or portion thereof.

In another aspect, a portable multifunction device includes a touch screen display, one or more processors, memory, and one or more programs. The one or more programs are stored in the memory and configured to be executed by the one or more processors. The one or more programs include: instructions for displaying a web page or portion thereof on the touch screen display; instructions for detecting an activation of an options icon; instructions for displaying, in response to detecting activation of the options icon, a plurality of icons including a web-clip widget creation icon; instructions for detecting an activation of the web-clip widget creation icon; and instructions for creating, in response to detecting activation of the web-clip widget creation icon, a web-clip widget corresponding to the displayed web page or portion thereof.

In another aspect, a computer readable storage medium has stored therein instructions, which when executed by a portable multifunction device with a touch screen display, cause the device to: display a web page or portion thereof on the touch screen display; detect an activation of an options icon; display, in response to detecting activation of the options icon, a plurality of icons including a web-clip widget creation icon; detect an activation of the web-clip widget creation icon; and create, in response to detecting activation of the web-clip widget creation icon, a web-clip widget corresponding to the displayed web page or portion thereof.

In another aspect, a portable multifunction device with a touch screen display includes: means for displaying a web page or portion thereof on the touch screen display; means for detecting an activation of an options icon; means for displaying, in response to detecting activation of the options icon, a plurality of icons including a web-clip widget creation icon; means for detecting an activation of the web-clip widget creation icon; and means for creating, in response to detecting activation of the web-clip widget creation icon, a web-clip widget corresponding to the displayed web page or portion thereof.

In another aspect, a computer-implemented method for use at a portable multifunction device with a touch screen display includes displaying an icon for a web-clip widget that corresponds to a user-specified area of a web page. An activation of the icon is detected; in response, the user-specified area of the web page is displayed.

In another aspect, a graphical user interface on a portable multifunction device with a touch screen display includes: (A) an icon for a web-clip widget corresponding to a user-specified area of a web page and (B) the user-specified area of the web page. In response to detecting activation of the icon, the user-specified area of the web page is displayed.

In another aspect, a portable multifunction device includes a touch screen display, one or more processors, memory, and one or more programs. The one or more programs are stored in the memory and configured to be executed by the one or more processors. The one or more programs include: instructions for displaying an icon for a web-clip widget corresponding to a user-specified area of a web page; instructions for detecting an activation of the icon; and instructions for displaying the user-specified area of the web page, in response to detecting activation of the icon.

In another aspect, a computer readable storage medium has stored therein instructions, which when executed by a portable multifunction device with a touch screen display, cause the device to display an icon for a web-clip widget corresponding to a user-specified area of a web page; detect an activation of the icon; and display the user-specified area of the web page, in response to detecting activation of the icon.

In another aspect, a portable multifunction device with a touch screen display includes means for displaying an icon for a web-clip widget corresponding to a user-specified area of a web page; means for detecting an activation of the icon; and means for displaying the user-specified area of the web page, in response to detecting activation of the icon.

Activation of a web-clip widget created in accordance with the disclosed embodiments displays a previously specified area in a web page. The user thus is spared from having to enlarge and center the area of the web page that is of interest each time the user visits the web page.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7F-7H are flow diagrams illustrating processes for displaying web-clip widgets in accordance with some embodiments.

DESCRIPTION OF EMBODIMENTS

Figure 1A:
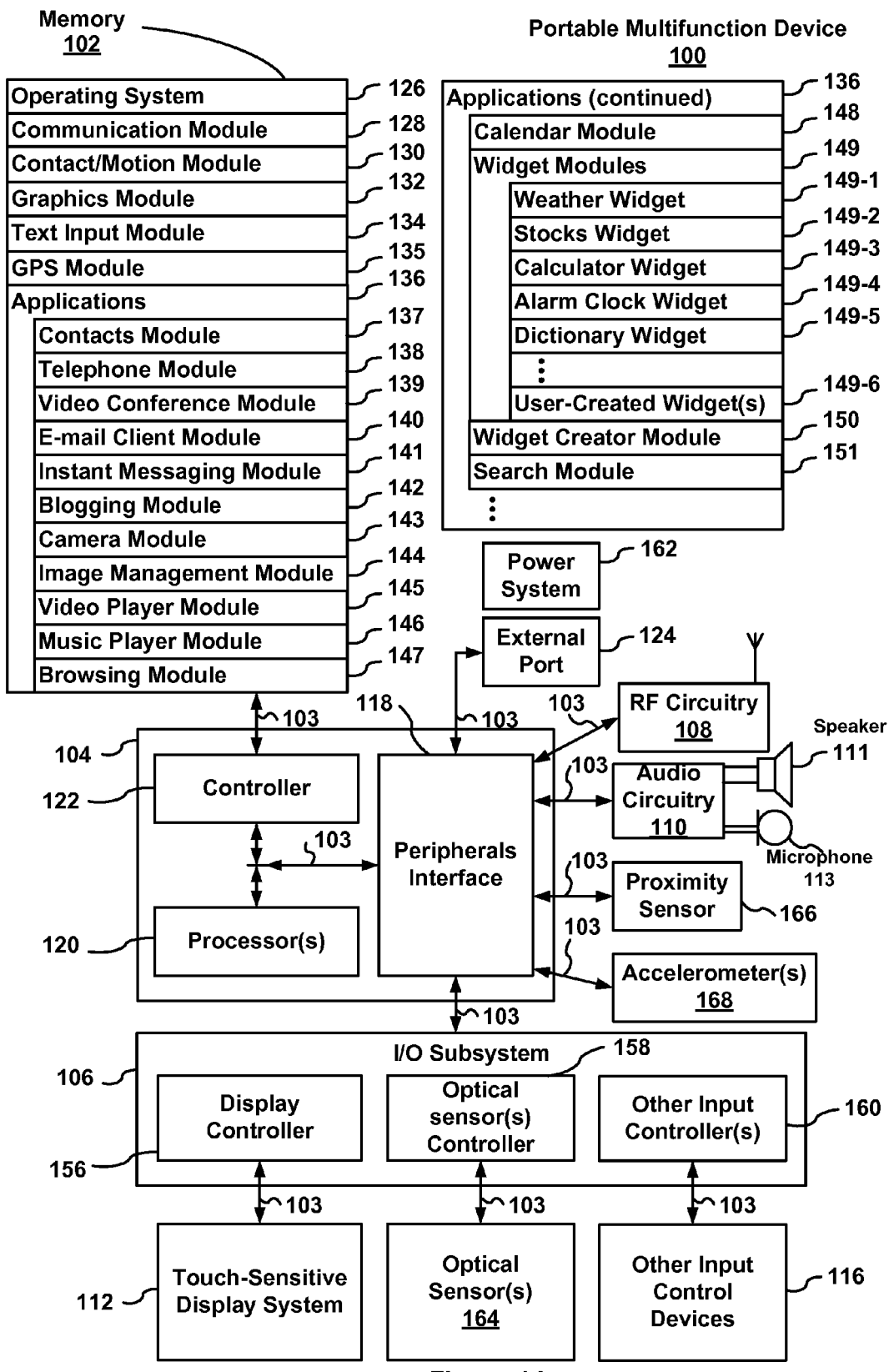
FIGS. 1A and 1B are block diagrams illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention.

As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
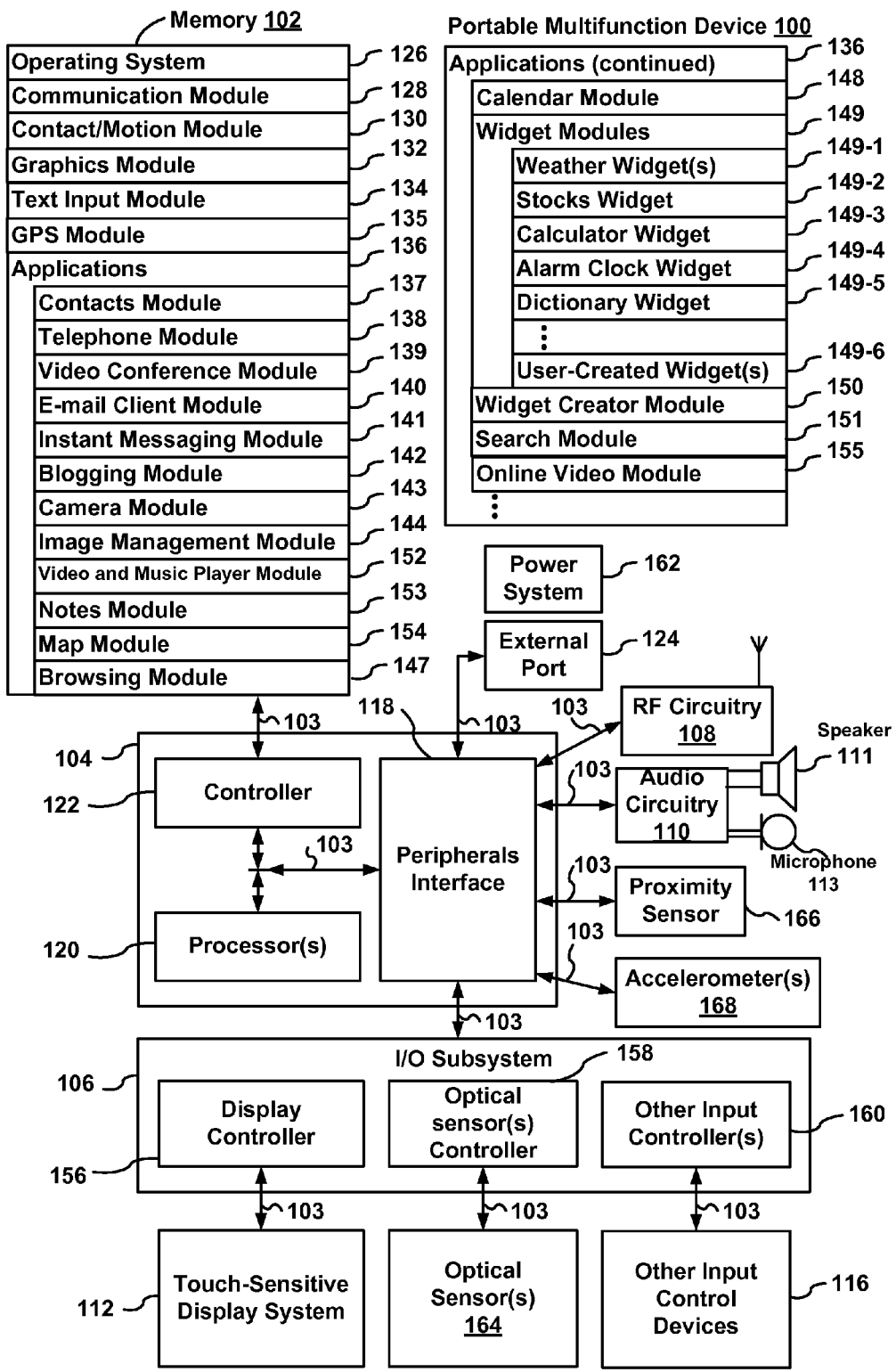

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference in their entirety herein.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," Sep. 30, 2005; Ser. No. 11/240,788, "Proximity Detector In Handheld Device," Sep. 30, 2005; Ser. No. 11/620,702, "Using Ambient Light Sensor To Augment Proximity Sensor Output"; Ser. No. 11/586,862, "Automated Response To And Sensing Of User Activity In Portable Devices." filed Oct. 24, 2006; and Ser. No. 11/638,251, "Methods And Systems For Automatic Configuration Of Peripherals," which are hereby incorporated by reference herein in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as expanding a user-selected web-page portion to fill a browser window). In this context, a respective animation that executes an action, or confirms an action by the user of the device, typically takes a predefined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets). Embodiments of user interfaces and associated processes using widget modules 149 are described further below.

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a web-clip widget). In some embodiments, a web-clip widget comprises a file containing an XML property list that includes a URL for the web page and data indicating the user-specified portion of the web page. In some embodiments, the data indicating the user-specified portion of the web page includes a reference point and a scale factor. In some embodiments, the data indicating the user-specified portion of the web page includes a set of coordinates within the web page or an identification of a structural element within the web page. Alternatively, in some embodiments a web-clip widget includes an HTML (Hypertext Markup Language) file, a CSS (Cascading Style Sheets) file, and a JavaScript file. Alternatively, in some embodiments a web-clip widget includes an XML (Extensible Markup Language) file and a JavaScript file.

In some embodiments a web-clip widget includes an image file (e.g., a png file) of an icon corresponding to the widget. In some embodiments, a web-clip widget corresponds to a folder containing the image file and a file that includes the URL for the web page and data indicating the user-specified portion of the web page. In some embodiments, a web-clip widget corresponds to a folder containing the image file and an executable script.

Embodiments of user interfaces and associated processes using widget creator module 150 are described further below.

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
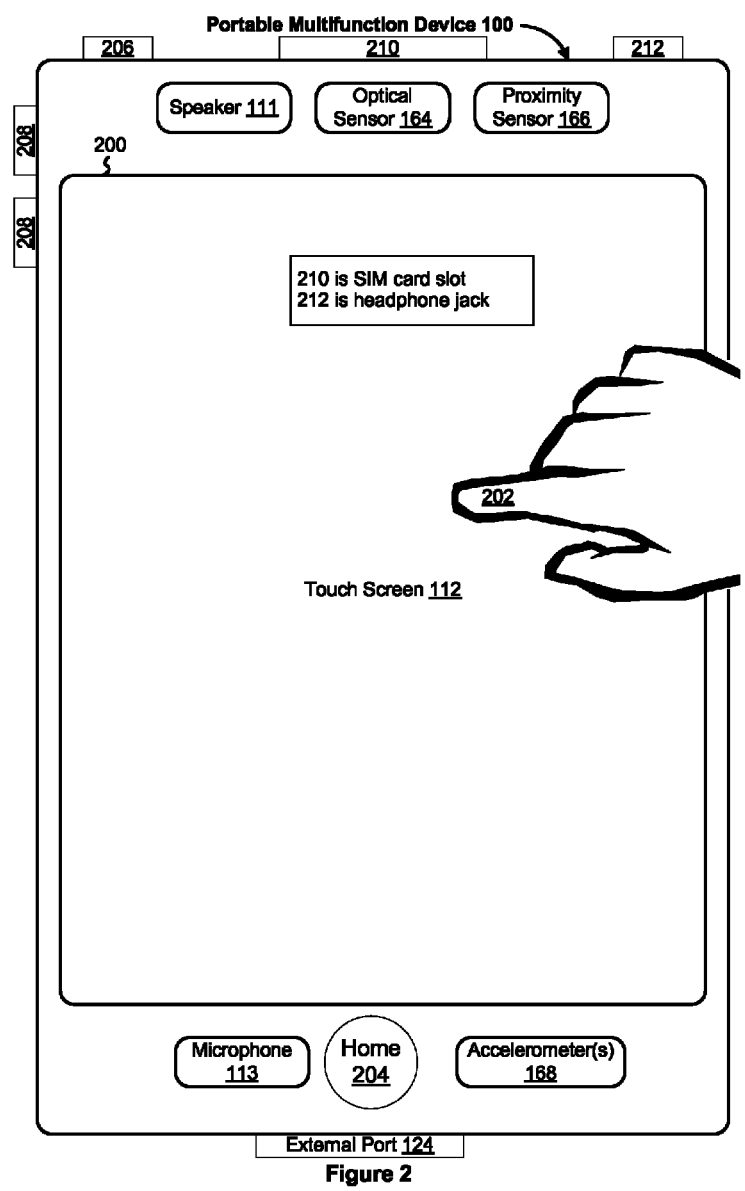
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
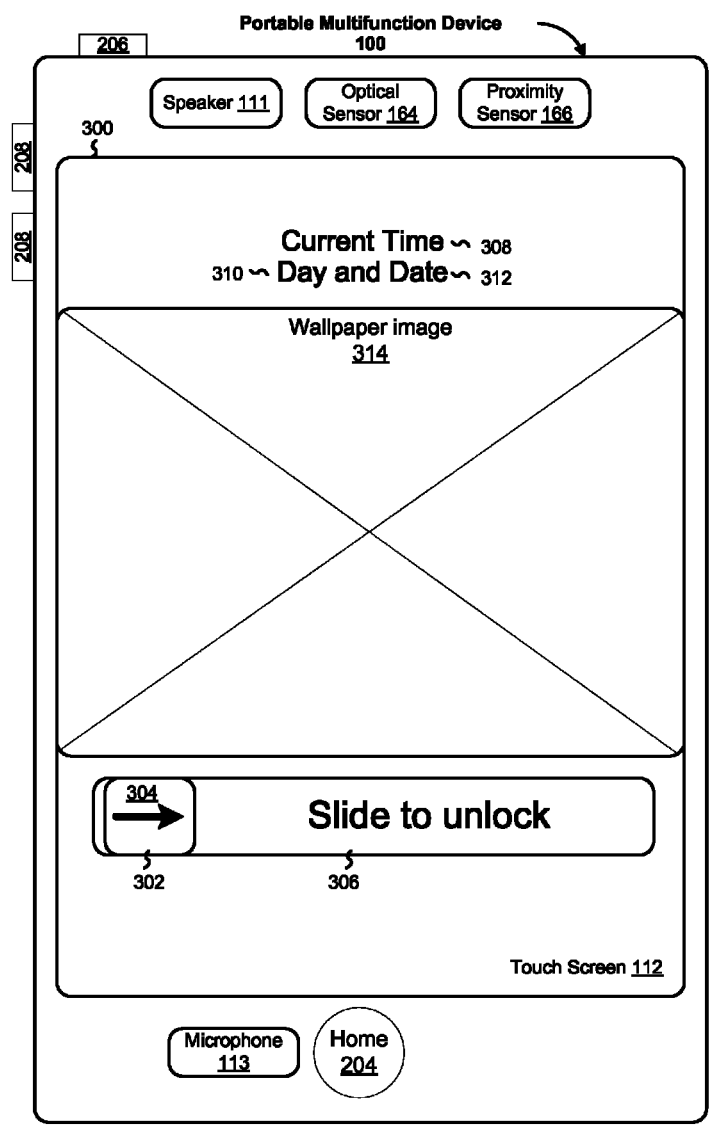
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. This process saves battery power by ensuring that the device is not accidentally awakened. This process is easy for users to perform, in part because of the visual cue(s) provided on the touch screen.

As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
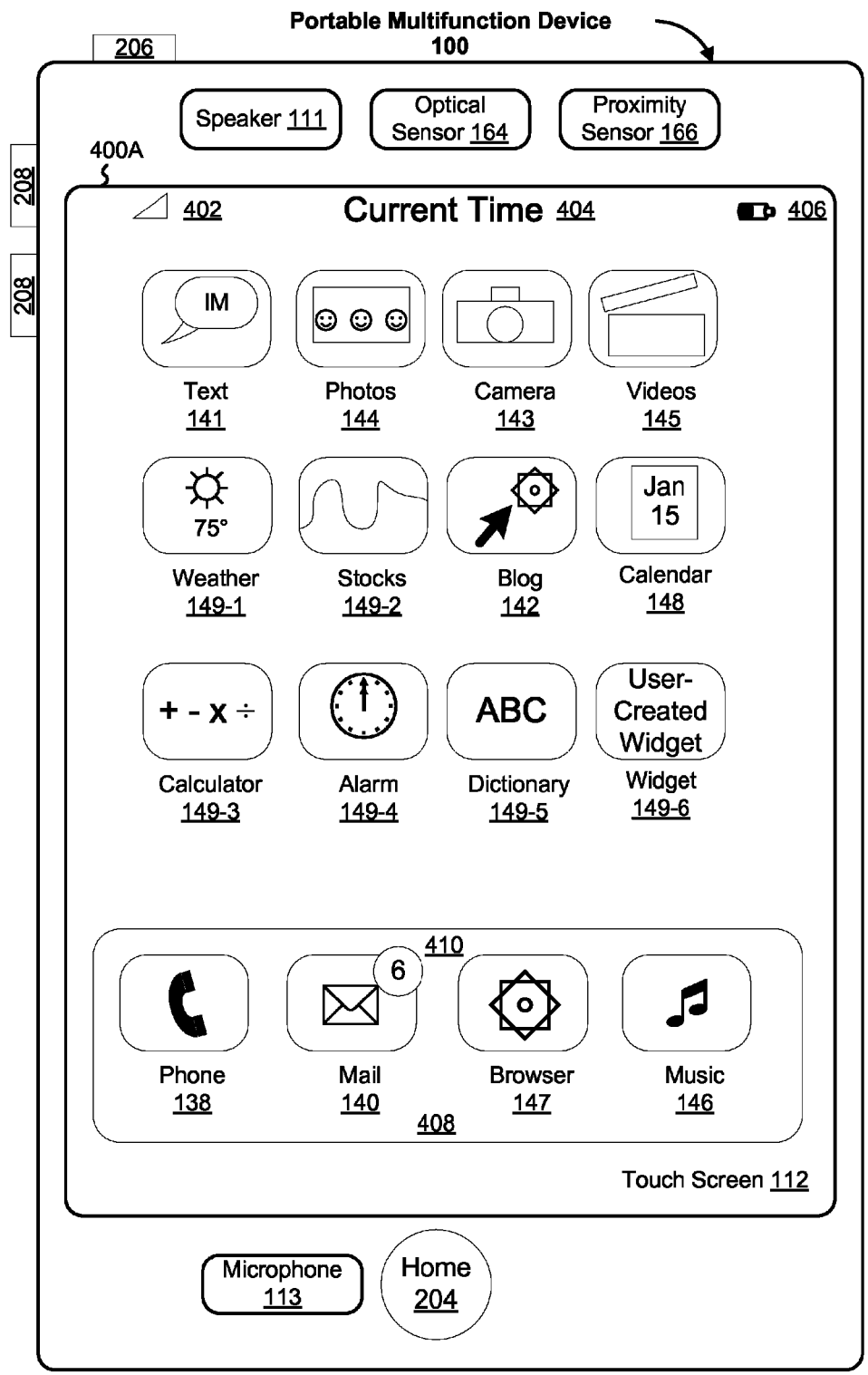
FIGS. 4A-4B illustrate exemplary user interfaces having menus of applications and/or widgets on a portable multifunction device in accordance with some embodiments.

FIG. 4A illustrates an exemplary user interface for a menu of applications on a portable multifunction device in accordance with some embodiments. In some embodiments, user interface 400A includes the following elements, or a subset or superset thereof:

Signal strength indicator 402 for wireless communication;
Time 404;
Battery status indicator 406;
Tray 408 with icons for frequently used applications, such as:
  Phone 138;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5;
  User-created widget 149-6; and
  Other applications (not shown)(e.g., map 154 and online video 155).

In some embodiments, UI 400A displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A provides integrated access to both widget-based applications and non-widget-based applications. In some embodiments, all of the widgets, whether user-created or not, are displayed in UI 400A. In other embodiments, activating the icon for user-created widget 149-6 may lead to another UI that displays the user-created widgets or icons corresponding to the user-created widgets. For example, UI 400B (FIG. 4B) displays a menu of six icons corresponding to six user-created widgets 149-6-1 through 149-6-6 in accordance with some embodiments. A user may activate a particular widget by gesturing on the corresponding icon. Alternatively, user-created widgets may be displayed in a list. UI 400C (FIG. 4C) illustrates a list of names of six user-created widgets 149-6-1 through 149-6-6 along with corresponding icons in accordance with some embodiments. A user may activate a particular widget by gesturing on the corresponding name or icon.

In some embodiments, a user may rearrange the icons in UI 400A, UI 400B, or UI 400C, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

FIGS. 5A-5I illustrate an exemplary user interface for a browser in accordance with some embodiments.

In some embodiments, user interface 3900A (FIG. 5A) includes the following elements, or a subset or superset thereof:
  402, 404, and 406, as described above;
  Previous page icon 3902 that when activated (e.g., by a finger tap on the icon) initiates display of a previous web page (if any);
  Web page name 3904;
  Next page icon 3906 that when activated (e.g., by a finger tap on the icon) initiates display of a next web page (if any);
  URL (Uniform Resource Locator) entry box 3908 for inputting URLs of web pages;
  Refresh icon 3910 that when activated (e.g., by a finger tap on the icon) initiates a refresh of the web page;
  Web page 3912 or other structured document, which includes a plurality of blocks 3914 of text content and other graphics (e.g., images);
  Settings icon 3916 that when activated (e.g., by a finger tap on the icon) initiates display of a settings menu for the browser;
  Bookmarks icon 3918 that when activated (e.g., by a finger tap on the icon) initiates display of a bookmarks list or menu for the browser;
  Options icon 3920 that when activated (e.g., by a finger tap on the icon) initiates display of a plurality of options, including options for creating a web-clip widget, adding a bookmark, and emailing a link to the displayed web page 3912 (e.g., UI 3900F, FIG. 5F, which like other UIs and pages, can be displayed in either portrait or landscape view); and
  New window icon 3922 that when activated (e.g., by a finger tap on the icon) initiates display of a UI for adding new windows to the browser (e.g., UI 3900G, FIG. 5G).

Figure 5A:
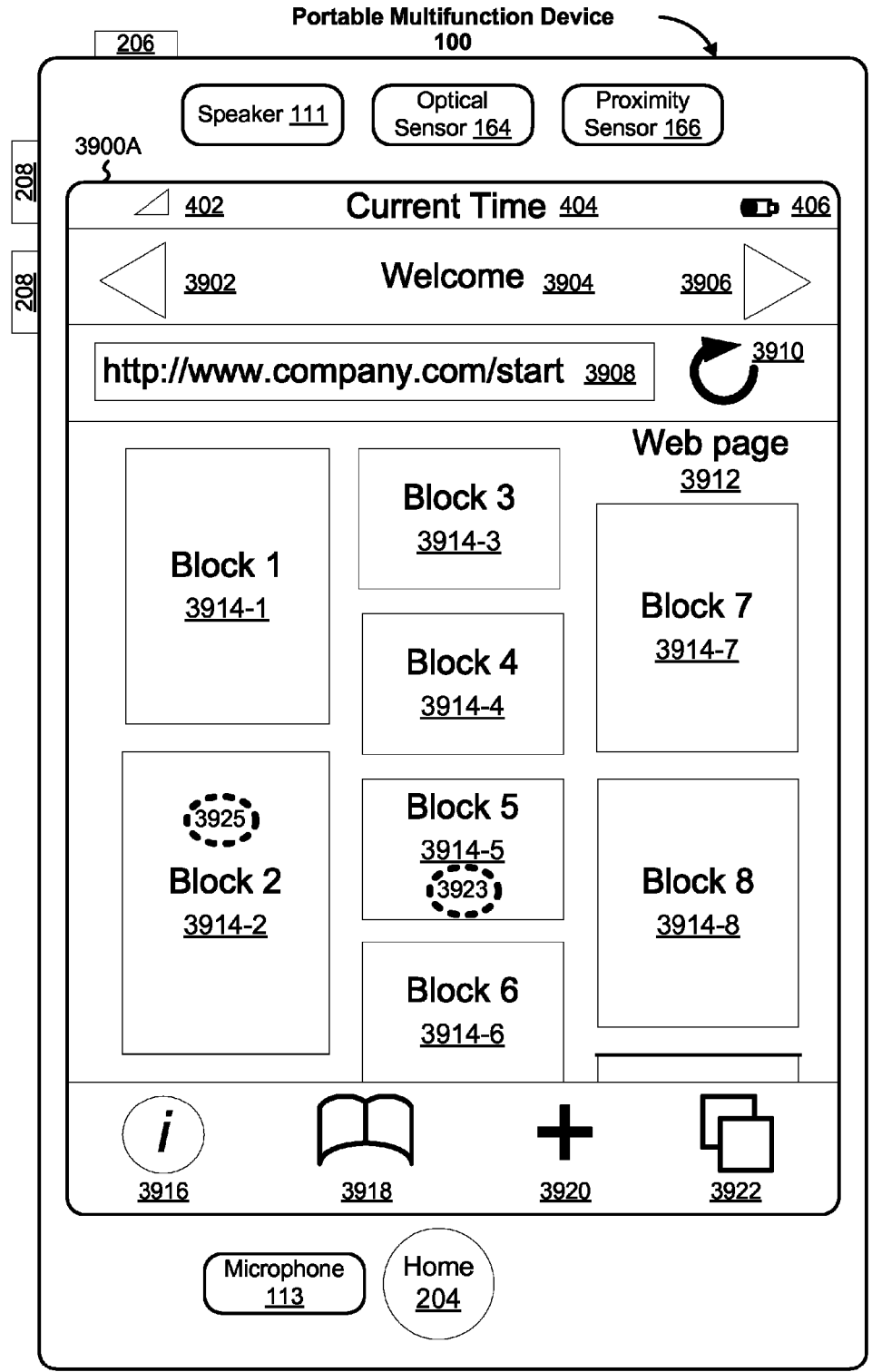
FIGS. 5A-5K illustrate an exemplary user interface for a browser in accordance with some embodiments.

In some embodiments, in response to a predefined gesture by the user on a block 3914 (e.g., a single tap gesture or a double tap gesture), the block is enlarged and centered (or substantially centered) in the web page display. For example, in response to a single tap gesture 3923 on block 3914-5, the user-selected block 3914-5 may be enlarged and centered in the display, as shown in UI 3900C (FIG. 5C). In some embodiments, the width of the user-selected block is scaled to fill the touch screen display. In some embodiments, the width of the user-selected block is scaled to fill the touch screen display with a predefined amount of padding along the sides of the display. In some embodiments, a zooming animation of the user-selected block is displayed during enlargement of the block. Similarly, in response to a single tap gesture 3925 on block 3914-2, block 3914-2 may be enlarged with a zooming animation and two-dimensionally scrolled to the center of the display (not shown).

In some embodiments, the device analyzes the render tree of the web page 3912 to determine the blocks 3914 in the web page. In some embodiments, a block 3914 corresponds to a render node that is: replaced; a block; an inline block; or an inline table.

In some embodiments, in response to the same predefined gesture by the user on a block 3914 (e.g., a single tap gesture or a double tap gesture) that is already enlarged and centered, the enlargement and/or centering is substantially or completely reversed. For example, in response to a single tap gesture 3929 on block 3914-5 (FIG. 5C), the web page image may zoom out and return to UI 3900A (FIG. 5A).

In some embodiments, in response to a predefined gesture (e.g., a single tap gesture or a double tap gesture) by the user on a block 3914 that is already enlarged but not centered, the block is centered (or substantially centered) in the web page display. For example, in response to a single tap gesture 3927 on block 3914-4 (FIG. 5C), block 3914-4 may be centered (or substantially centered) in the web page display. Similarly, in response to a single tap gesture 3935 on block 3914-6, block 3914-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging in combination with scrolling when the web page is reduced in size, UI 3900A and (2) reversing the enlargement and/or centering if the block is already centered and enlarged).

In some embodiments, in response to a multi-touch (3931 and 3933) de-pinching gesture by the user (FIG. 5C), the web page may be enlarged. Conversely, in response to a multi-touch pinching gesture by the user, the web page may be reduced.

In some embodiments, in response to a substantially vertical upward (or downward) swipe gesture by the user, the web page (or, more generally, other electronic documents) may scroll one-dimensionally upward (or downward) in the vertical direction. For example, in response to an upward swipe gesture 3937 by the user that is within a predetermined angle (e.g., 27°) of being perfectly vertical, the web page may scroll one-dimensionally upward in the vertical direction.

Conversely, in some embodiments, in response to a swipe gesture that is not within a predetermined angle (e.g., 27°) of being perfectly vertical, the web page may scroll two-dimensionally (i.e., with simultaneous movement in both the vertical and horizontal directions). For example, in response to an upward or diagonal swipe gesture 3939 by the user that is not within a predetermined angle (e.g., 27°) of being perfectly vertical, the web page may scroll two-dimensionally along the direction of the swipe 3939.

In some embodiments, in response to a multi-touch (3941 and 3943) rotation gesture by the user, the web page may be rotated exactly 90° (UI 3900D, FIG. 5D) for landscape viewing, even if the amount of rotation in the multi-touch (3941 and 3943) rotation gesture is substantially different from 90°. Similarly, in response to a multi-touch (3945 and 3947) rotation gesture by the user (UI 3900D, FIG. 5D), the web page may be rotated exactly 90° for portrait viewing, even if the amount of rotation in the multi-touch (3945 and 3947) rotation gesture is substantially different from 90°.

Thus, in response to imprecise gestures by the user, precise movements of graphics occur. The device behaves in the manner desired by the user despite inaccurate input by the user. Also, note that the gestures described for UI 3900C, which has a portrait view, are also applicable to UIs with a landscape view (e.g., UI 3900D, FIG. 5D) so that the user can choose whichever view (portrait or landscape) the user prefers for web browsing.

Figure 5B:
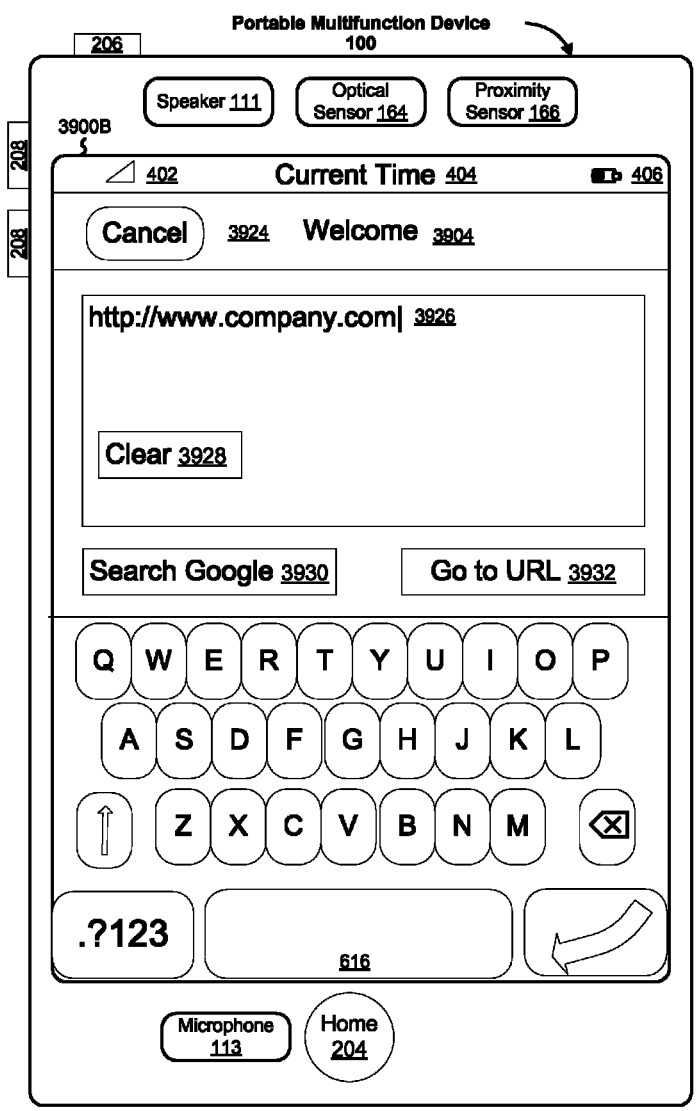
Figure 5C:
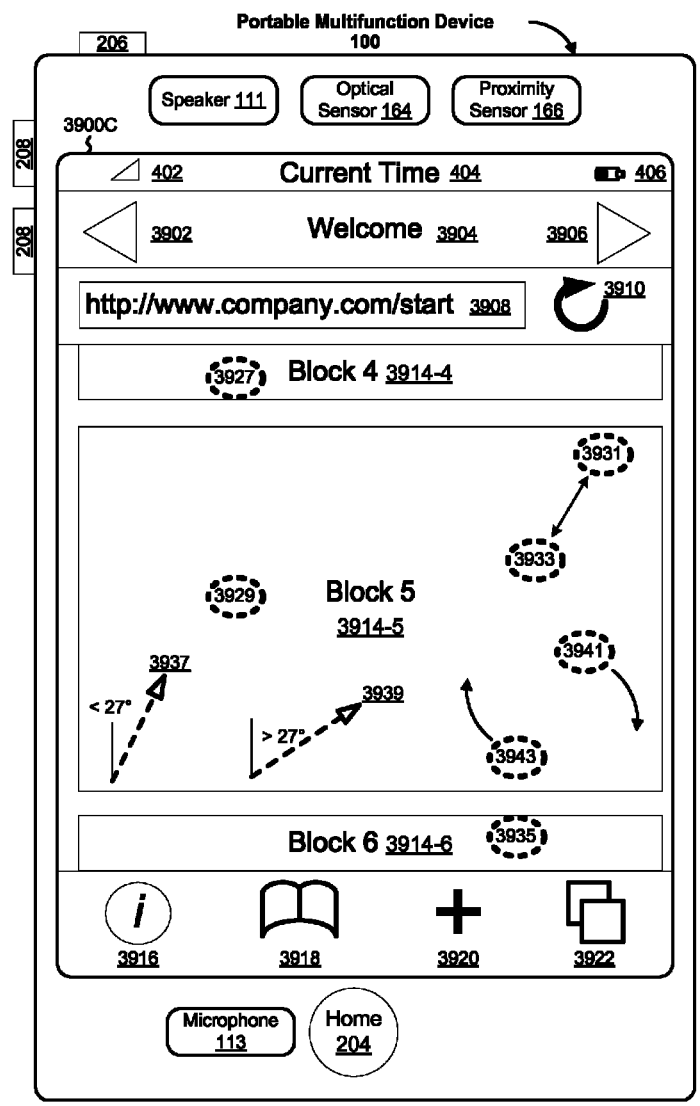
Figure 5D:
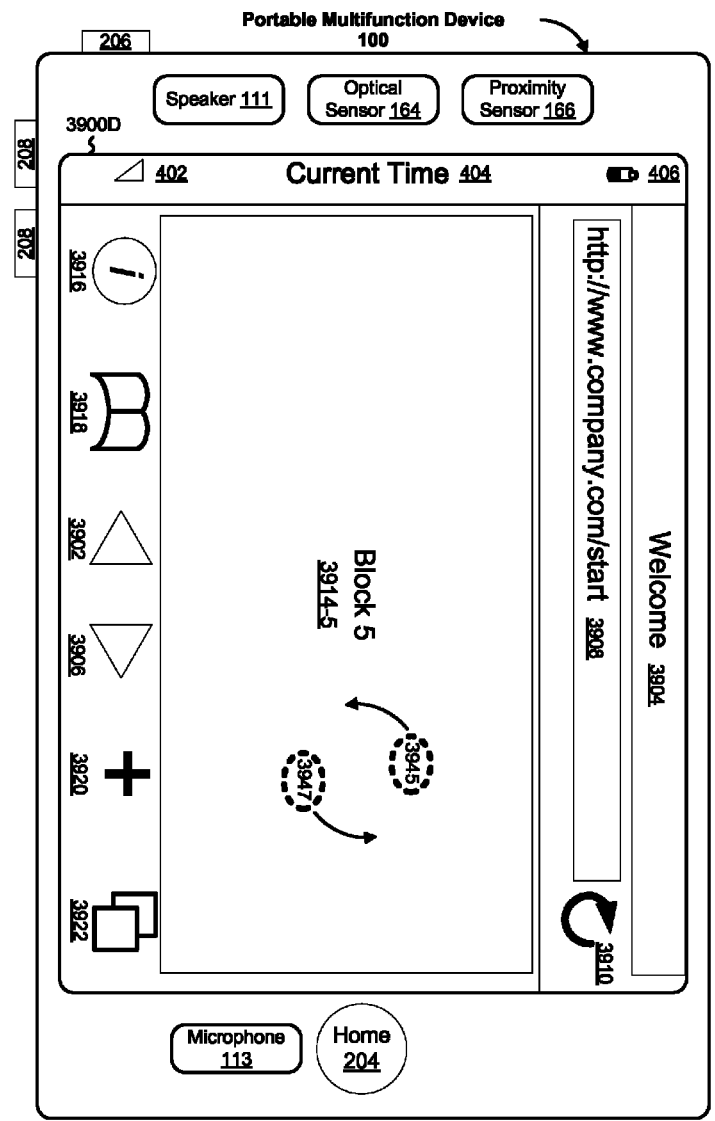
Figure 5E:
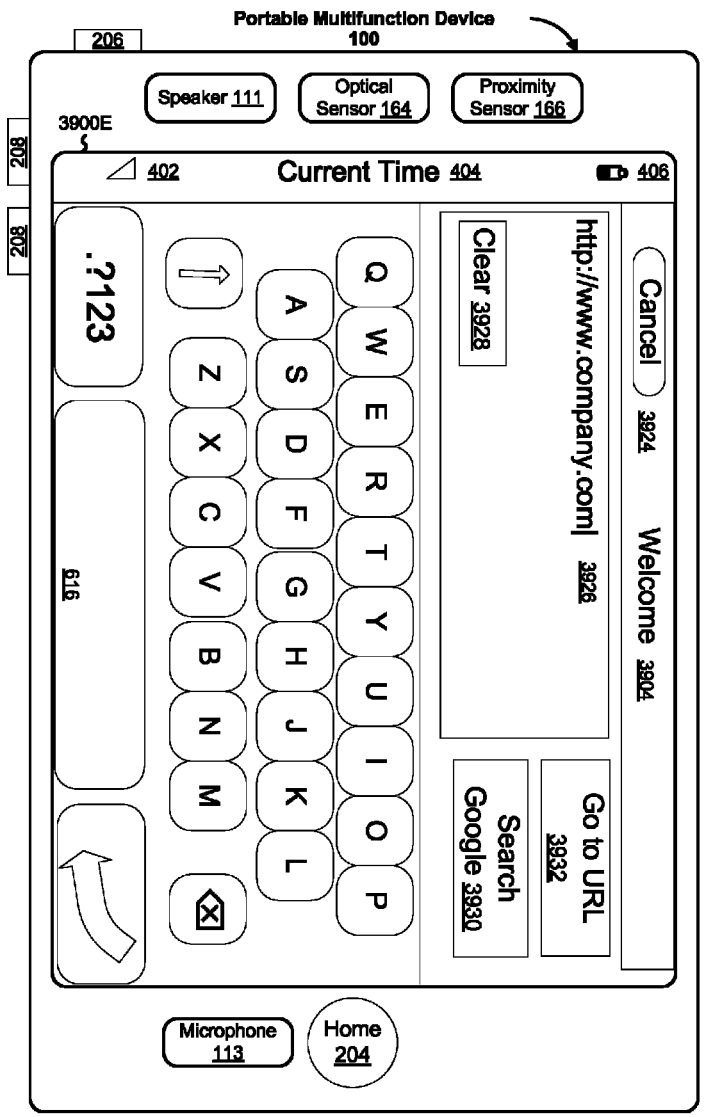

In some embodiments, in response to a tap or other predefined user gesture on URL entry box 3908 (UI 3900A, FIG. 5A), the touch screen displays an enlarged entry box 3926 and a keyboard 616 (e.g., UI 3900B, FIG. 5B in portrait viewing and UI 3900E, FIG. 5E in landscape viewing). In some embodiments, the touch screen also displays:

Contextual clear icon 3928 that when activated (e.g., by a finger tap on the icon) initiates deletion of all text in entry box 3926;

a search icon 3930 that when activated (e.g., by a finger tap on the icon) initiates an Internet search using the search terms input in box 3926; and Go to URL icon 3932 that when activated (e.g., by a finger tap on the icon) initiates acquisition of the web page at the URL in box 3926;

Thus, the same entry box 3926 may be used for inputting both search terms and URLs. In some embodiments, whether or not clear icon 3928 is displayed depends on the context.

UI 3900G (FIG. 5G) is a UI for adding new windows to an application, such as the browser 147. UI 3900G displays an application (e.g., the browser 147), which includes a displayed window (e.g., web page 3912-2) and at least one hidden window (e.g., web pages 3912-1 and 3912-3 and possibly other web pages that are completely hidden off-screen). UI 3900G also displays an icon for adding windows to the application (e.g., new window or new page icon 3936). In response to detecting activation of the icon 3936 for adding windows, the browser adds a window to the application (e.g., a new window for a new web page 3912).

In response to detecting a gesture on the touch screen display, a displayed window in the application is moved off the display and a hidden window is moved onto the display. For example, in response to detecting a tap gesture 3949 on the left side of the screen, the window with web page 3912-2 is moved partially or fully off-screen to the right, the window with web page 3912-3 is moved completely off-screen, partially hidden window with web page 3912-1 is moved to the center of the display, and another completely hidden window (not shown in FIG. 5G) with a web page may be moved partially onto the display. Alternatively, detection of a left-to-right swipe gesture 3951 may achieve the same effect.

Conversely, in response to detecting a tap gesture 3953 on the right side of the screen, the window with web page 3912-2 is moved partially or fully off-screen to the left, the window with web page 3912-1 is moved completely off-screen, partially hidden window with web page 3912-3 is moved to the center of the display, and another completely hidden window (not shown in FIG. 5G) with a web page may be moved partially onto the display. Alternatively, detection of a right-to-left swipe gesture 3951 may achieve the same effect.

In some embodiments, in response to a tap or other predefined gesture on a delete icon 3934 (e.g., 3934-2 or 3934-3), the corresponding window 3912 is deleted. In some embodiments, in response to a tap or other predefined gesture on Done icon 3938, the window in the center of the display (e.g., 3912-2) is enlarged to fill the screen.

A user may create a web-clip widget in accordance with some embodiments. Activation of the user-created web-clip widget displays a previously specified area in a web page (having a specified URL) at a specified display size or scale factor. In some embodiments, the area in the web page is specified by scaling and/or translating the display of the web page. For example, a specified area in the web page is enlarged and centered. The specified area may be displayed in a browser application (e.g., the browser 147) or other application. For example, activation of the web-clip widget may display a particular block that is of interest to the user within the web page; furthermore, the block may be enlarged. Activation of the web-clip widget thus enables the user to view the particular block of interest without having to enlarge and center the web page area that is of interest each time the user visits the web page. In some embodiments, after activation of the web-clip widget, the user may manipulate the display to view other portions of the web page by scaling and/or translating the display. Alternatively, in some embodiments, the user may not be permitted to manipulate the display.

Web-clip widgets provide more functionality than mere bookmarks: activation of a bookmark only displays a specified web page, while activation of a web-clip widget displays a specified area of a web page at a specified display size or scale factor in accordance with some embodiments. Similarly, a web-clip widget is distinguishable from a hyperlink. To view a web page or portion thereof specified by a hyperlink, the user must activate the browser application, navigate to a web page containing the hyperlink, activate the hyperlink, and then potentially scroll and/or scale the resulting web page. In contrast, to view an area of a web page specified by a web-clip widget, the user merely activates the widget.

In some embodiments, the web-clip widget corresponds to a block or other structural element of the web page. As described in U.S. patent application Ser. No. 11/620,492, "Selecting and Manipulating Web Content," filed on Jan. 5, 2007, which application is incorporated by reference herein in its entirety, structural elements that are displayed in a web page may be identified during the web-clip widget creation process. In some embodiments, if the dimensions of a selected structural element change after creation of a web-clip widget, the area that is displayed upon activation of the web-clip widget is changed accordingly.

In some embodiments, a web-clip widget comprises a URL for the web page and data (e.g., metadata) indicating the user-specified portion of the web page. For example, in some embodiments the web-clip widget comprises a file containing an XML property list that includes the URL and the data indicating the user-specified portion of the web page. In some embodiments, the data indicating the user-specified portion of the web page includes a reference point (e.g., a corner point or center point for the widget) and a scale factor. In some embodiments, the data indicating the user-specified portion of the web page includes a set of coordinates within the web page (e.g., a user-defined rectangle) or an identification of a structural element within the web page. The application for viewing the web-clip widget (e.g., the browser 147) is configured to process the data indicating the user-specified portion of the web page and to display the corresponding portion.

In some embodiments a web-clip widget comprises an executable script. In some embodiments, the widget includes an HTML (Hypertext Markup Language) file, a CSS (Cascading Style Sheets) file, and a JavaScript file. In some embodiments, the widget includes an XML (Extensible Markup Language) file and a JavaScript file (e.g., Yahoo! Widgets).

To the extent that any application incorporated by reference herein includes a definition of web-clip widgets that contradicts the definition in the preceding five paragraphs, the definition in the preceding five paragraphs is to be considered controlling for purposes of interpreting the specification and claims of the present application.

Figure 7A:
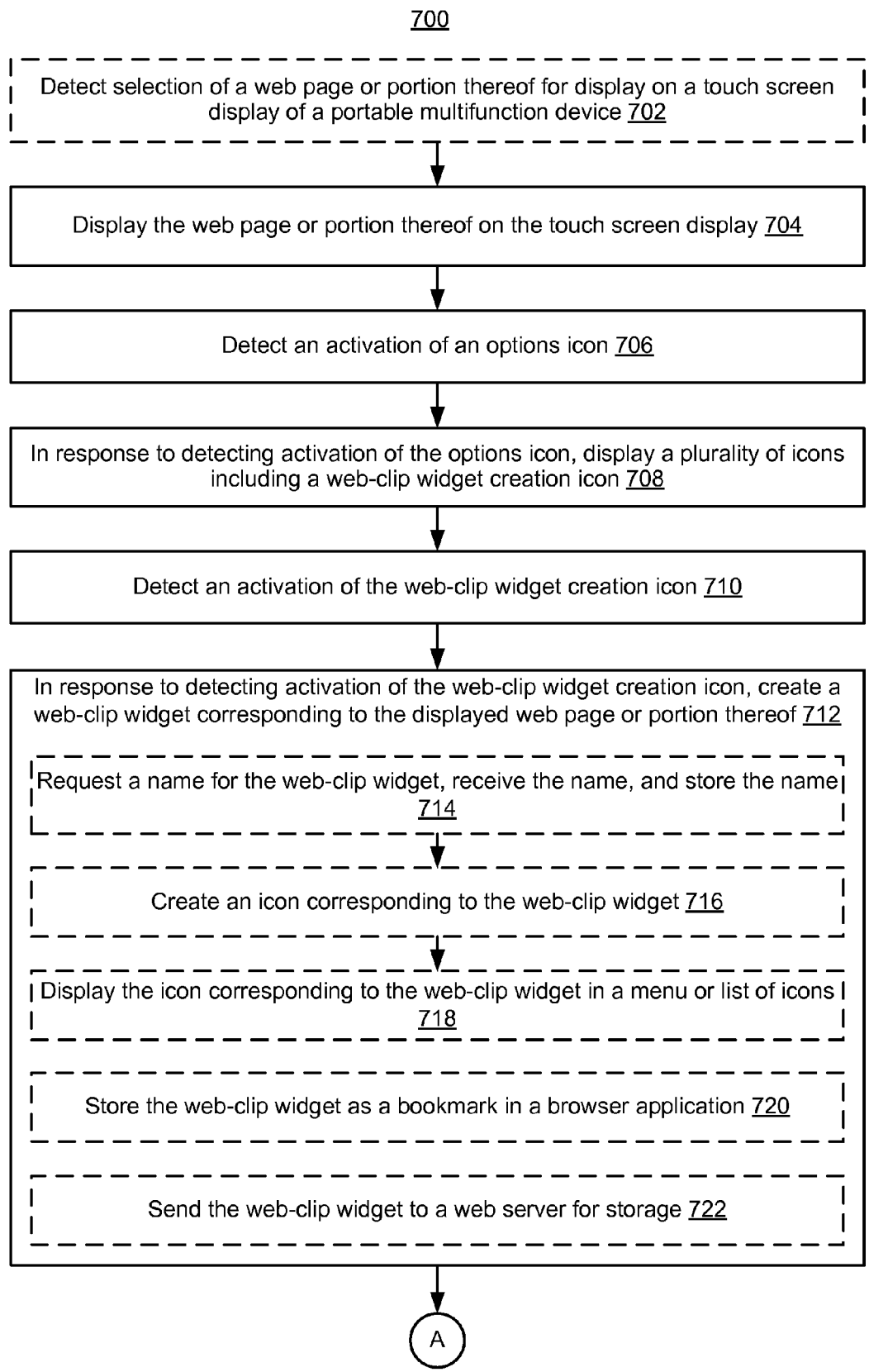
FIGS. 7A-7E are flow diagrams illustrating processes for creating and using a web-clip widget in accordance with some embodiments.

Referring to FIG. 5C, in some embodiments, once a user has centered and/or enlarged an area of a web page (e.g., block 3914-5), the user may initiate creation of a web-clip widget by activating the options icon 3920. The options icon 3920 is an example of an options icon referenced in operation 706 of process 700 (FIG. 7A, below). In some embodiments, the user activates the options icon 3920 by performing a tap or other predefined gesture on the options icon 3920.

As a result of activating the options icon 3920, a user interface such as UI 3900F (FIG. 5F) is displayed (e.g., operation 708, FIG. 7A), which includes a plurality of icons 3972. In some embodiments, the plurality of icons 3972 includes an icon 3973 for creating a web-clip widget, an icon 3974 for adding a bookmark (e.g., via UI 3900I, FIG. 5I), an icon 3975 for emailing a link corresponding to the displayed web page 3912, and a cancel icon 3976 for returning to the previous UI.

If the user activates the "create web-clip widget" icon 3973, a web-clip widget corresponding to the centered and/or enlarged area of the web page (e.g., block 3914-5 or the entire displayed portion of the web page 3912), will be created (e.g., operations 710 and 712, FIG. 7A). Text and/or graphics displayed for the icon 3973 may vary. In some embodiments, for example, the icon 3973 may be labeled "Add to Home Screen."

In some embodiments, in response to user activation of the "create web-clip widget" icon 3973 (FIG. 5F), UI 3900H (FIG. 5H) will appear and will prompt the user to enter the widget name in text entry box 3960 using the contextual keyboard 616. In some embodiments, the user can access other keyboards that display other symbols by activating the alternate keyboard selector icon 618. In some embodiments, UI 3900H includes an image 3978 of the selected area of the web page. Once the user has completed entering the widget name in the text entry box 3960, the user activates the add-widget icon 3928 and the widget is created. Alternately, the user may activate the cancel icon 3928 to avoid creating the widget.

In some embodiments, as a result of activating the "create web-clip widget" icon 3973, a web-clip widget corresponding to the centered and/or enlarged area of the web page will be created and assigned a name without any further actions by a user. In some embodiments, instead of displaying a user interface such as UI 3900H (FIG. 5H) for receiving a name, the newly created web-clip widget may be assigned the same name as the web page name 3904.

Figure 4B:
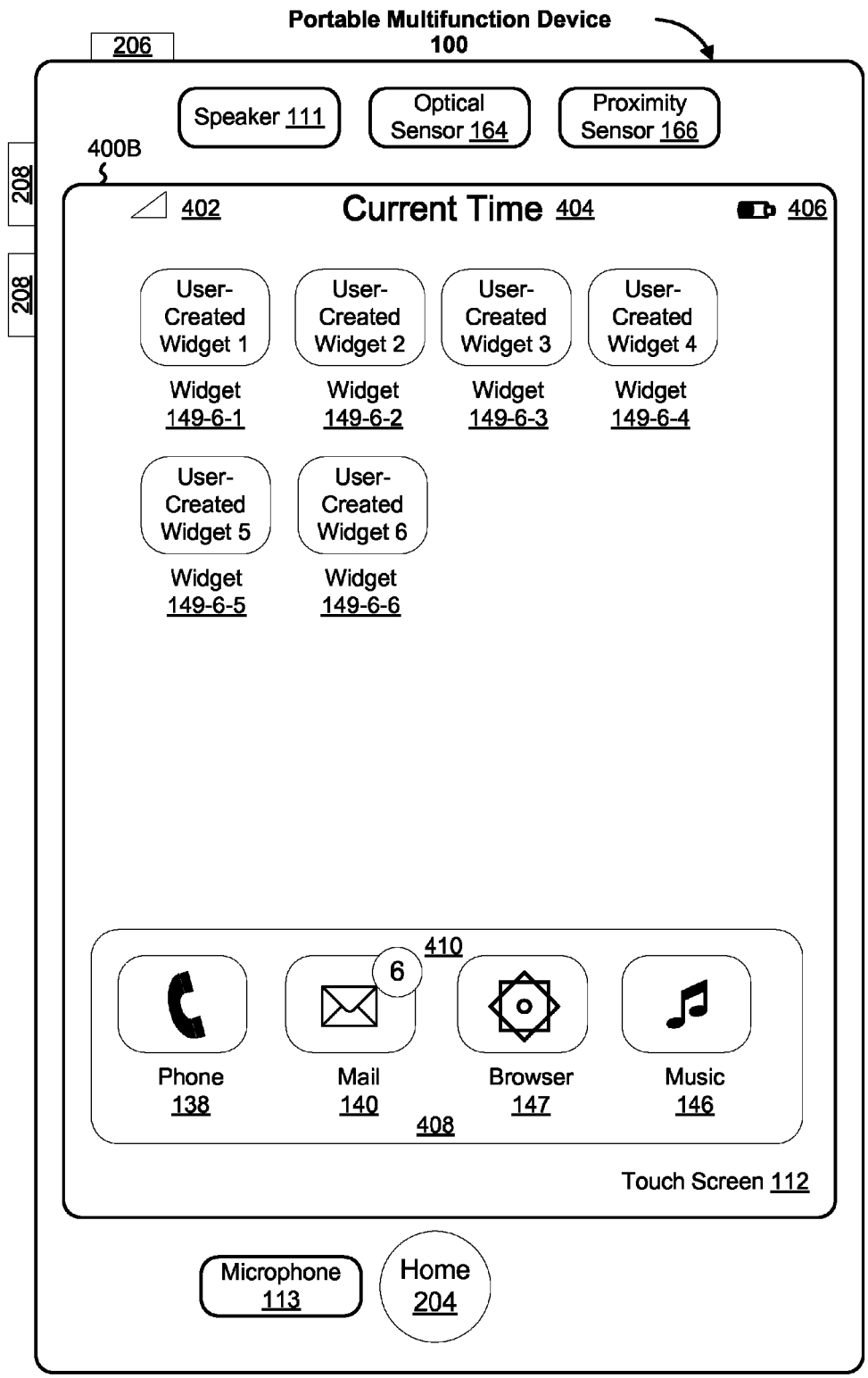
Figure 4C:
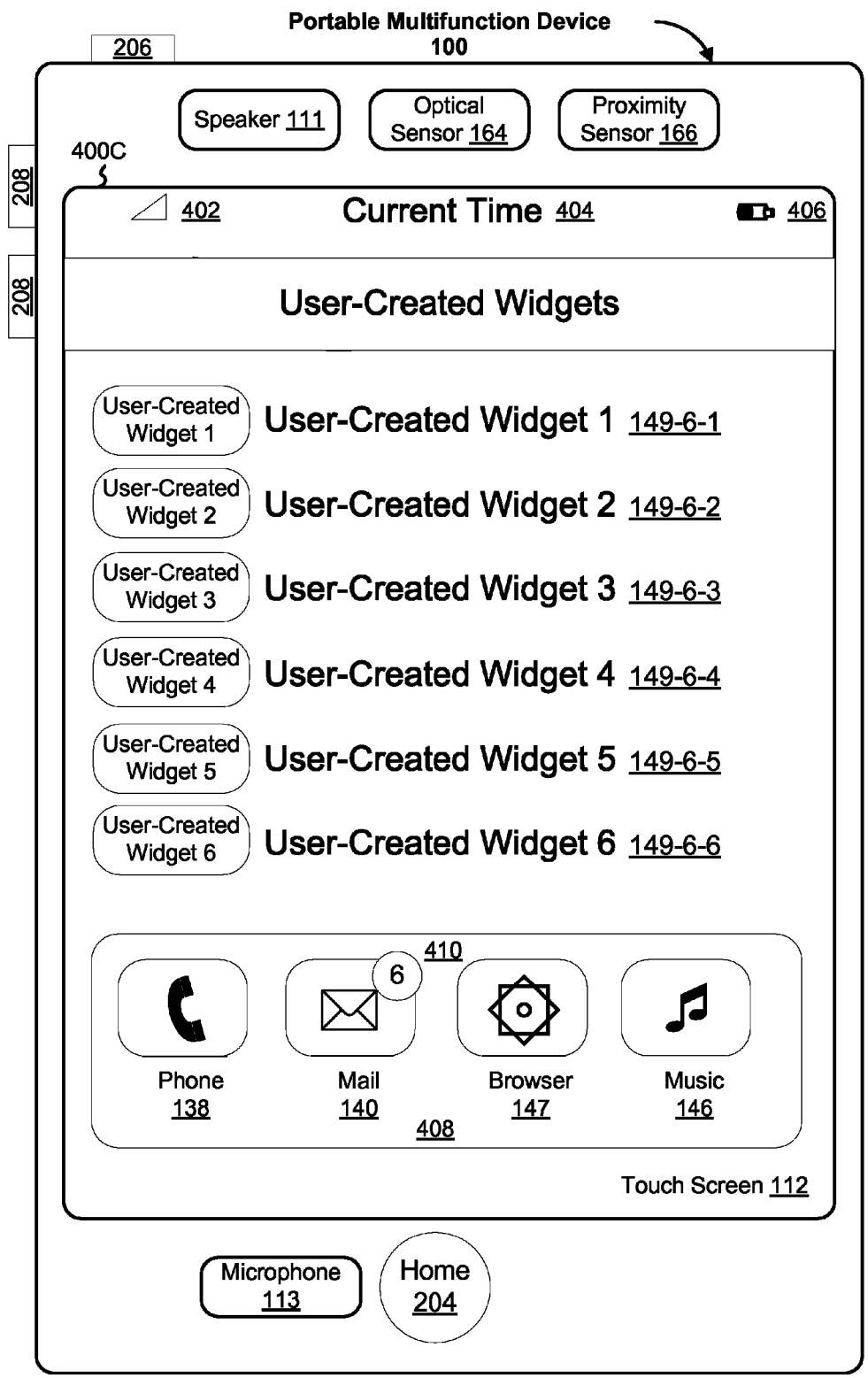
FIG. 4C illustrates an exemplary user interface having a list of user-created widgets on a portable multifunction device in accordance with some embodiments.

An icon corresponding to the newly created widget may be created and displayed on a menu in a UI such as UI 400A or UI 400B (FIG. 4A or 4B). Alternatively, the icon and/or the name of the newly created widget may be listed on a UI such as UI 400C (FIG. 4C). Subsequent activation of the newly created widget will launch an application (e.g., the browser 147) that will display the web-clip widget. In some embodiments, the web-clip widget is displayed within the browser UI (e.g., UI 3900C, FIG. 5C). In some embodiments, the web-clip widget is displayed without other elements of the browser UI (e.g., without elements 3902, 3906, 3908, and/or 3910), such that the web-clip widget appears to be its own mini-application rather than a portion of a web page displayed in a browser. In some embodiments, the web-clip widget is displayed with decorative features such as a decorative frame or a border resembling a torn page. In some embodiments, the decorative features are user-customizable.

For example, as described above, a user viewing web page 3912 (FIG. 5A) may enlarge and center block 3914-5 by performing a tap gesture 3923 (e.g., a single tap or a double tap) on block 3914-5. As a result, block 3914-5 appears enlarged and centered in the browser window, as shown in FIG. 5C. The user then may perform gestures (e.g., taps) on the options icon 3920 and the web-clip widget creation icon 3973 (FIG. 5F) to create a widget corresponding to block 3914-5, in accordance with some embodiments. In some embodiments, the user then enters a widget name in the text entry box 3960 (FIG. 5H) and activates the add-widget icon 3928. A corresponding icon may be created and displayed on a menu such as in UI 400A or 400B (FIG. 4A or 4B) or in a list such as in UI 400C (FIG. 4C). In some embodiments, subsequent activation of the newly created widget will launch the browser 147, which will display block 3914-5, as shown in UI 3900C (FIG. 5C).

In some embodiments, instead of or in addition to performing a tap gesture 3923 (FIG. 5A) to center and enlarge a block, a user may define the area of a web page to be associated with a widget by performing one or more other gestures. Examples of gestures that may be used to define the area of the web page include a tap gesture 3927 or 3935 (FIG. 5C) to center an adjacent enlarged block; a multi-touch depinching gesture (3931 and 3933) (FIG. 5C) to enlarge the web page; a multi-touch pinching gesture (not shown) to reduce the web page; swipe gestures such as a substantially vertical swipe 3937 (FIG. 5C), an upward or diagonal swipe 3939 (FIG. 5C), and/or other swipe gestures (not shown) to scroll the web page; and/or a multi-touch rotation gesture (3941 and 3943) to select a portrait or landscape view (FIG. 5C).

In some embodiments, instead of first defining the area of the web page to be associated with the web-clip widget and then activating the options icon 3920 (e.g., FIG. 5C) and the "create web-clip widget" icon 3973 (FIG. 5F), a user may first activate the icons 3920 and 3973 and then define the area by performing gestures that are detected by the touch screen display, such as those described above. Once the area has been selected and/or scaled, the user may make a gesture on the touch screen to indicate that the area of the web page to be associated with the widget has been defined.

In some embodiments, in response to the user activating the "create web-clip widget" icon 3973 (FIG. 5F), the device displays a user interface (e.g., UI 3900K, FIG. 5K) that lets the user define the area of the web page to be associated with the widget. The user may define the area using gestures such as the gestures described above with reference to UIs 3900A, 3900C, and 3900D (FIGS. 5A, 5C, and 5D). In some embodiments, the user interface may include information 3950 to help guide the user. In some embodiments, the user may activate a cancel icon 3952 to abort the widget creation process and may activate an add widget icon 3954 to complete the widget creation process. In some embodiments, a rotation gesture such as multi-touch rotation gesture (3941 and 3943, FIG. 5C) rotates the entire UI 3900K, and not just the defined area, from portrait viewing to landscape viewing or vice versa.

In some embodiments, in response to the user activating the "create web-clip widget" icon 3973 (FIG. 5F), the device displays a user interface (e.g., UI 3900J, FIG. 5J) that lets the user define the area of a web page to be associated with a widget by toggling between frames. The frames are successively overlaid on the web page to frame or highlight successive blocks and other structural elements of the web page. For example, in UI 3900J a frame 3958 frames block 2 3914-2. The user may activate a toggle icon 3956 to toggle between successive blocks. Once a block of interest is framed, the user may activate an add widget icon 3954 to create a widget corresponding to the framed block. The user may activate a cancel icon 3952 to end the widget creation process.

Figure 5F:
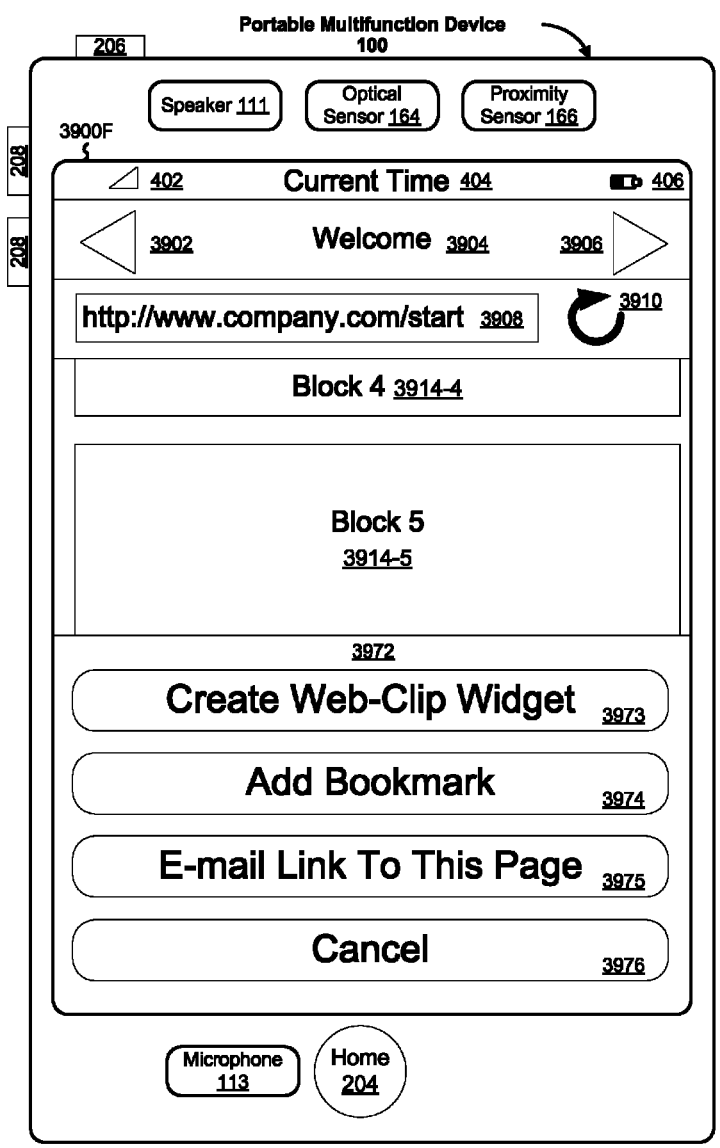
Figure 5G:
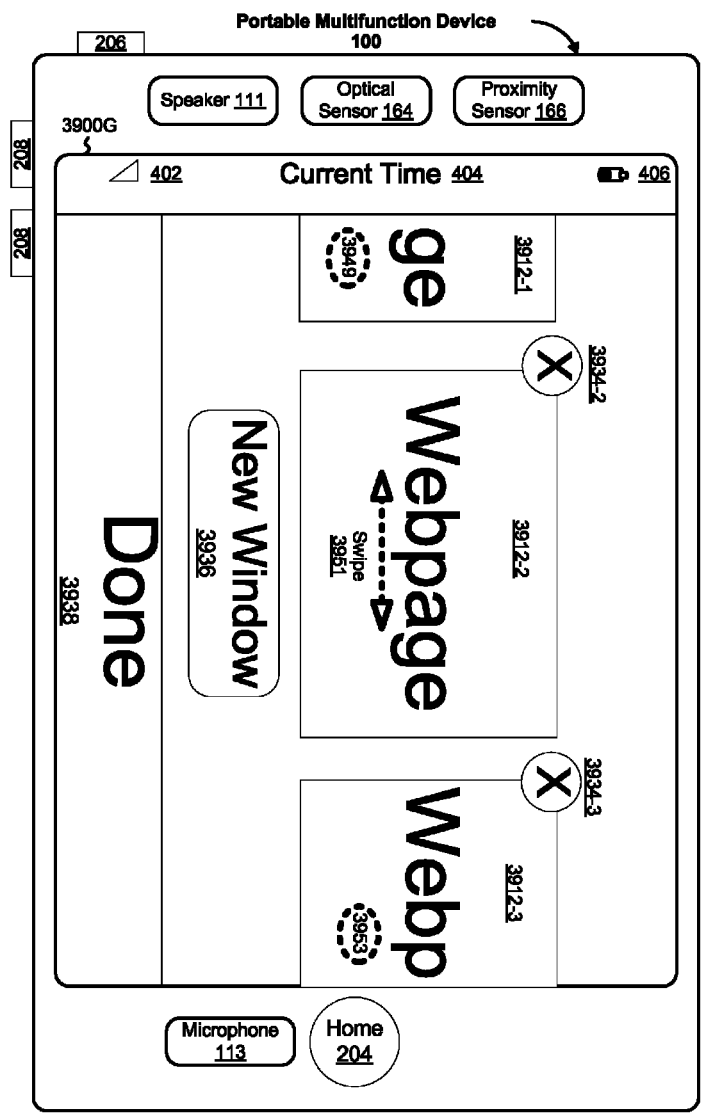
Figure 5H:
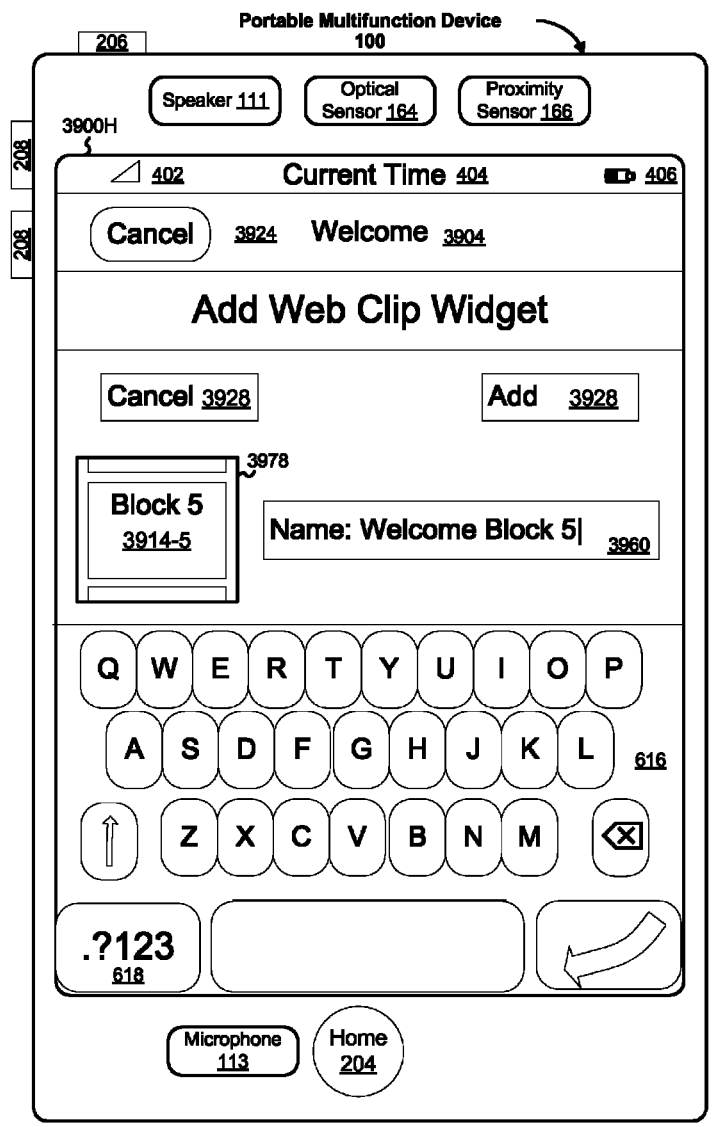
Figure 5I:
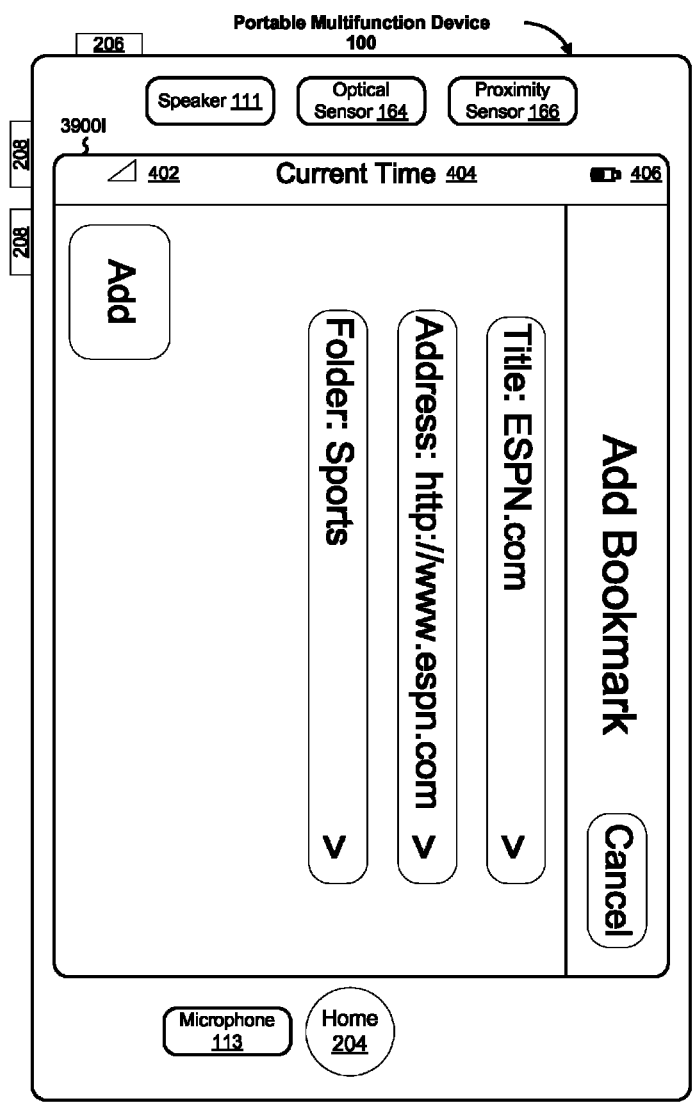
Figure 5J:
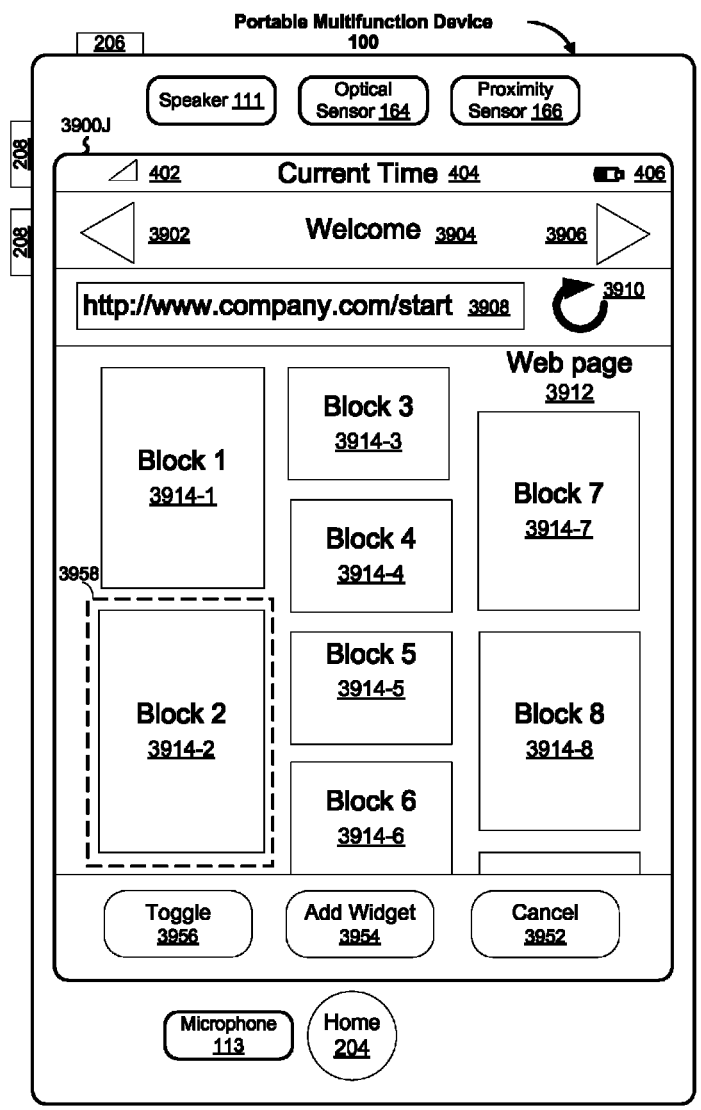
Figure 5K:
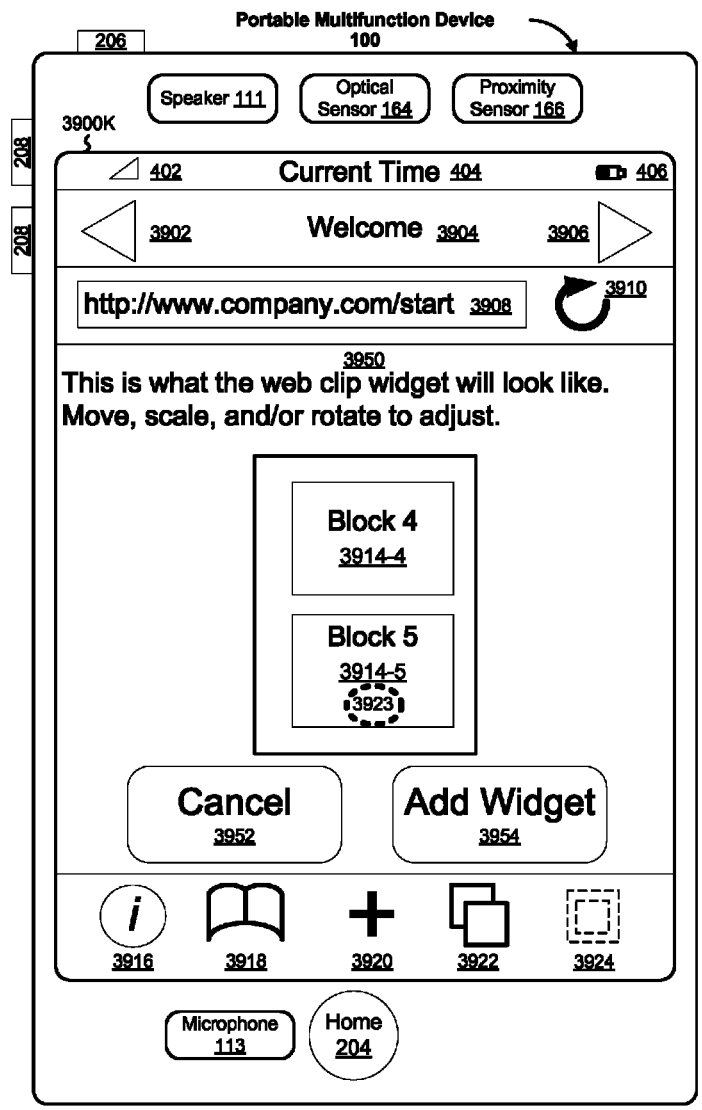
Figure 6A:
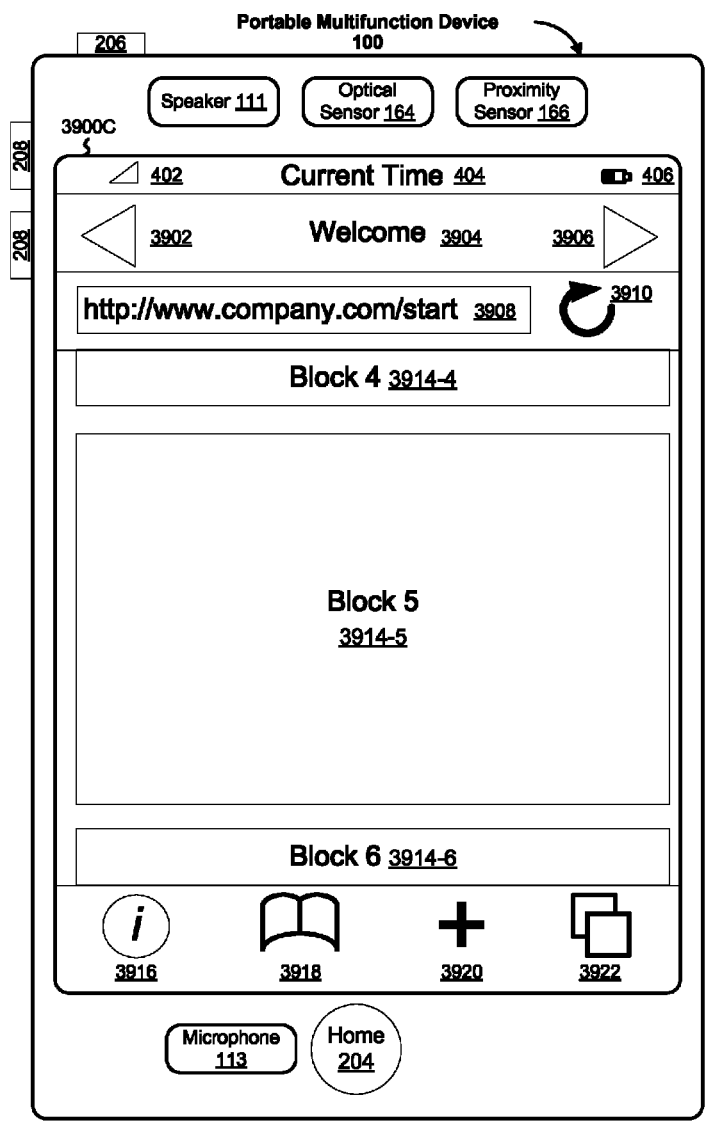
FIGS. 6A-6D illustrate an animation for creating and displaying an icon corresponding to a web-clip widget in accordance with some embodiments.
Figure 6B:
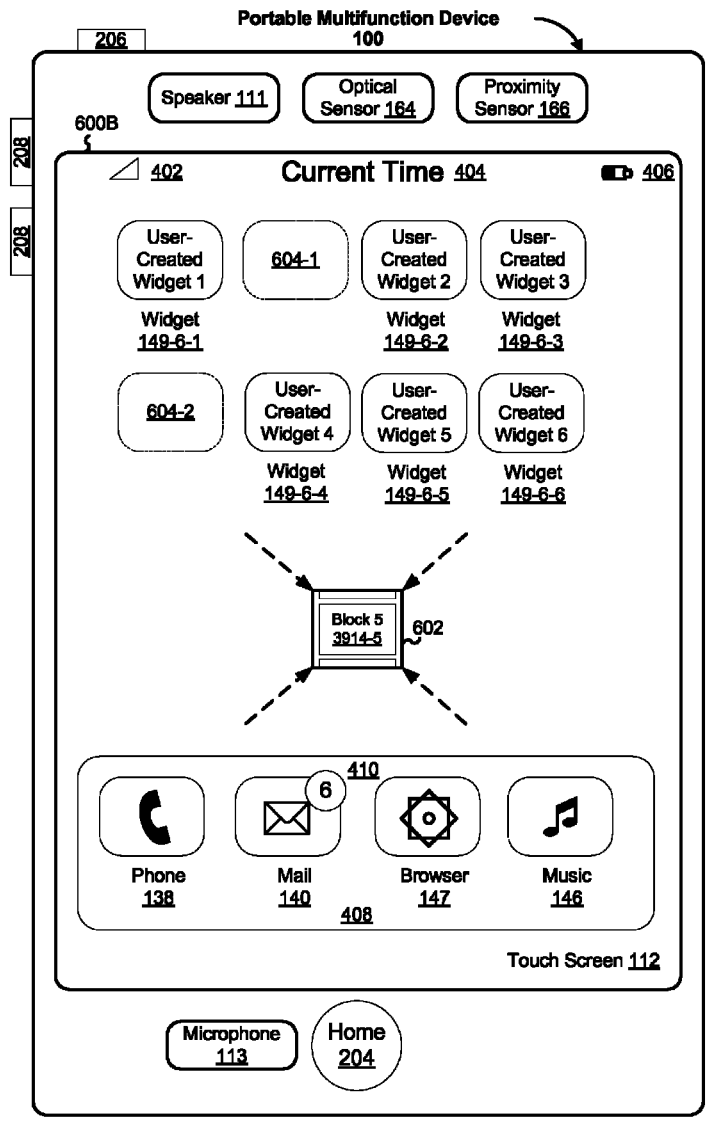
Figure 6C:
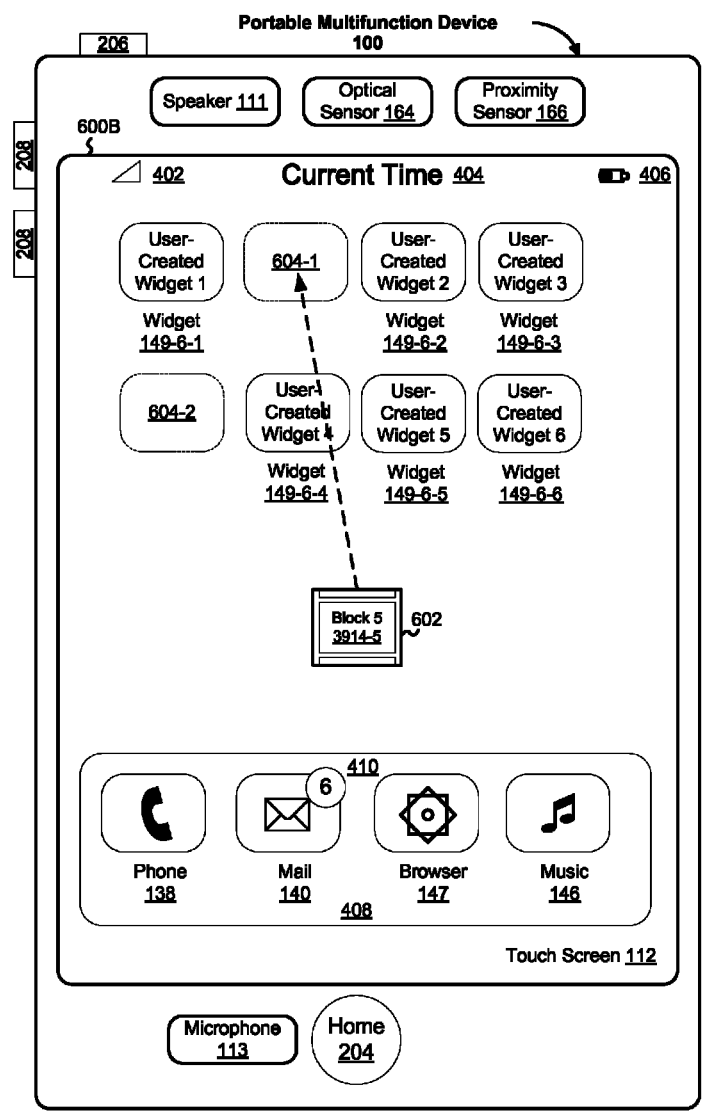
Figure 6D:
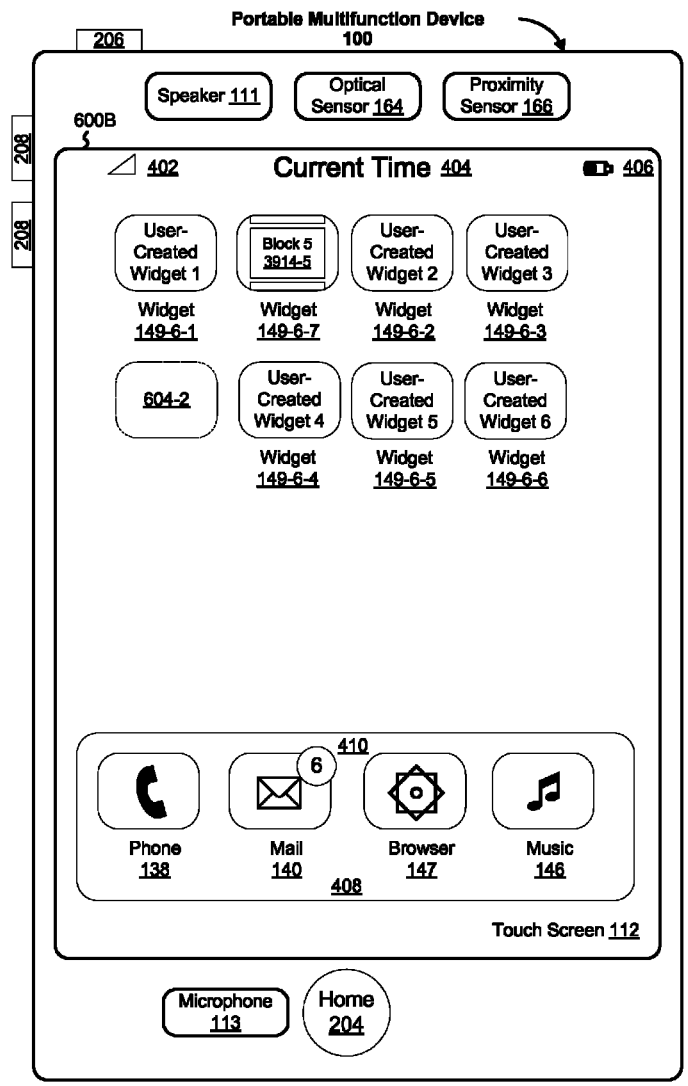

In some embodiments, creating and displaying an icon corresponding to the newly created web-clip widget includes displaying an animation, as illustrated in FIGS. 6A-6D in accordance with some embodiments. The animation may be displayed, for example, after activation of the add-widget icon 3928 (FIG. 5H) or after activation of the "create web-clip widget" icon 3973 (FIG. 5F). In the animation, the selected area of the web page 3912 corresponding to the newly created web-clip widget (e.g., block 3914-5 in UI 3900C) is displayed, as illustrated in FIG. 6A. The displayed image is shrunk down, as illustrated for image 602 (FIG. 6B), and displayed over a menu of icons. In some embodiments, the menu of icons includes vacant areas (e.g., 604-1 and 604-2, FIG. 6B) in which an icon could be displayed but is not currently displayed. The image 602 may be moved (FIG. 6C) into the first available vacancy 604-1, where it is displayed as an icon corresponding to the new web-clip widget 149-6-7 (FIG. 6D). In some embodiments, the first available vacancy is the left-most vacancy in the highest row with a vacancy. In other embodiments, the image is moved into another vacancy or is appended to the menu after the last (e.g., lowest and right-most) vacancy.

In some embodiments, instead of displaying an animation, the icon corresponding to the newly created web-clip widget is simply displayed in a first available vacancy in a menu of icons or in another available vacancy in the menu, or is appended to the menu.

Figure 6E:
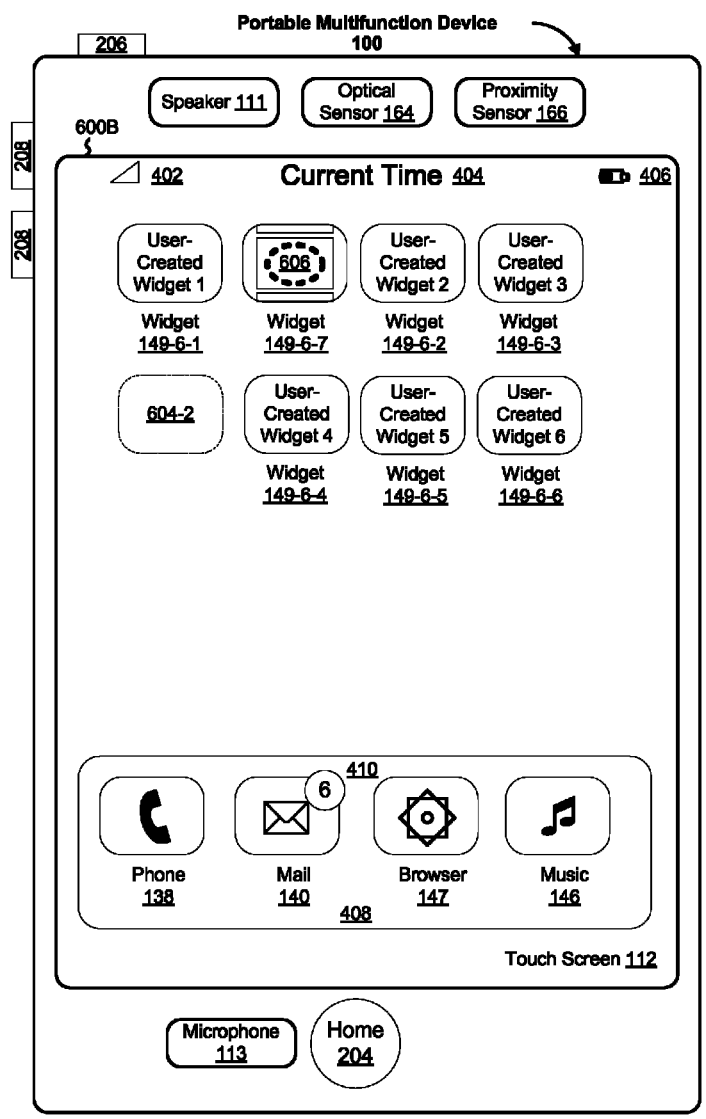
FIG. 6E illustrates an exemplary user interface for activating a web-clip widget in accordance with some embodiments.

Activation of the icon corresponding to the newly created web-clip widget 149-6-7 (e.g., by a gesture 606 (FIG. 6E) on the icon, such as a tap gesture) results in display of the corresponding web-clip widget (e.g., display of block 3914-5, as shown in FIG. 6A) in the browser application or in its own mini-application without other elements of the browser UI.

Figure 5L:
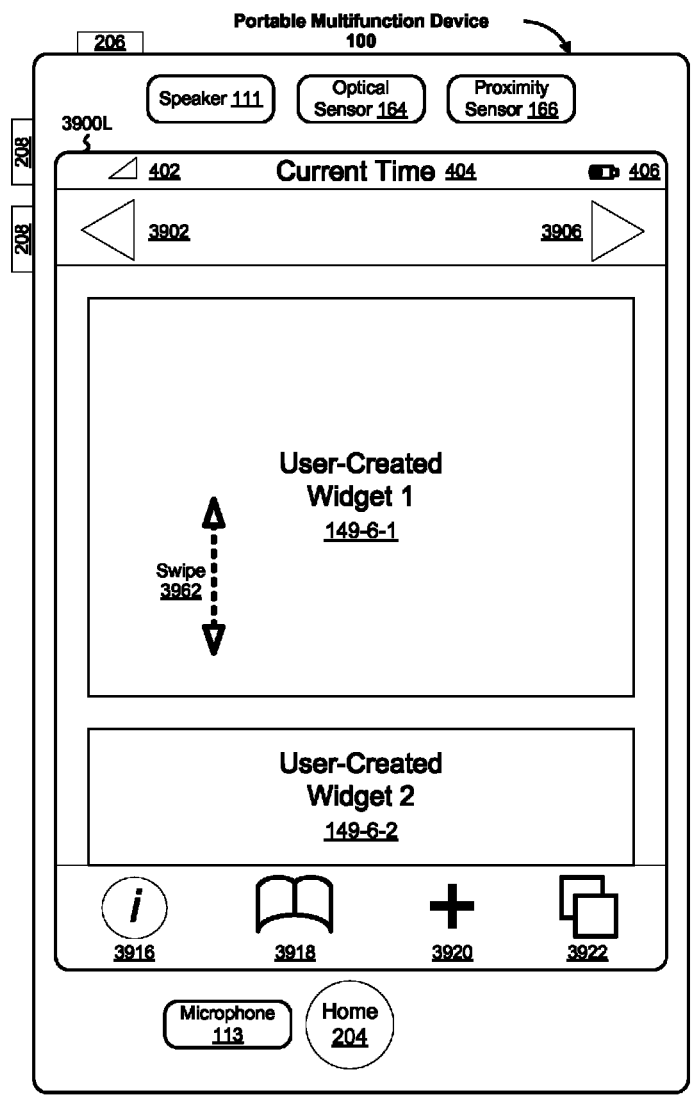
FIGS. 5L and 5M illustrate exemplary user interfaces for displaying web-clip widgets in accordance with some embodiments.

UI 3900L (FIG. 5L) is a UI for displaying a portion of two or more web-clip widgets, in accordance with some embodiments. The displayed portion may include a first web-clip widget (e.g., 149-6-1), and may include all or a portion of additional web-clip widgets (e.g., 149-6-2). The displayed portion is scrolled in response to detecting a gesture on the touch screen display, such as a swipe gesture 3962.

UI 3900M (FIG. 5M) is a UI for displaying a web-clip widget (e.g., 149-6-2) in accordance with some embodiments. In response to detecting a gesture on the touch screen display, display of the web-clip widget is ceased and another web-clip widget is displayed. For example, in response to detecting a downward swipe 3962 or a tap gesture 3964 at the top of the displayed widget 149-6-2, display of the web-clip widget 149-6-2 is ceased and a previous user-created widget 149-6-1 is displayed. In response to detecting an upward swipe 3962 or a tap gesture 3966 at the bottom of the displayed widget 149-6-2, display of the web-clip widget 149-6-2 is ceased and a next user-created widget 149-6-3 is displayed. Alternatively, in response to detecting a substantially horizontal right-to-left swipe 3963 or a tap gesture 3965 at the right side of the displayed widget 149-6-2, display of the web-clip widget 149-6-2 is ceased and a next user-created widget 149-6-3 is displayed. In response to detecting a substantially horizontal left-to-right swipe 3963 or a tap gesture 3967 at the left side of the displayed widget 149-6-2, display of the web-clip widget 149-6-2 is ceased and a previous user-created widget 149-6-1 is displayed.

FIG. 7A is a flow diagram illustrating a process 700 for creating a web-clip widget from a web page or portion thereof on a portable multifunction device with a touch screen display in accordance with some embodiments. While the web-clip widget creation process 700 described below includes a number of operations that appear to occur in a specific order, it should be apparent that the process 700 can include more or fewer operations, which can be executed serially or in parallel (e.g., using parallel processors or a multi-threading environment), an order of two or more operations may be changed, and/or two or more operations may be combined into a single operation.

In some embodiments, selection of a web page or portion thereof for display is detected (702). For example, one or more finger gestures are detected on the touch screen display to select the web page or portion thereof. In some embodiments, the one or more finger gestures include one or more finger gestures to scale an area in the web page. In some embodiments, the one or more finger gestures include one or more finger gestures to center an area in the web page. Examples of finger gestures used to select, center, and/or scale an area in the web page include a tap gesture 3923 or 3925 to center and enlarge a block (FIG. 5A); a tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to translate the web page; and/or a multi-touch rotation gesture (3941 and 3943) to select a portrait or landscape view (FIG. 5C).

The web page or portion thereof is displayed (704) on the touch screen display. In the example of FIG. 5C, block 3914-5 is displayed on the touch screen display.

An activation of an options icon (e.g., icon 3920) is detected (706). In some embodiments, detecting activation of the options icon includes detecting a finger gesture (e.g., a tap gesture) on the options icon.

In response to detecting activation of the options icon, a plurality of icons (e.g., 3972, FIG. 5F) is displayed (708) including a web-clip widget creation icon (e.g., icon 3973, FIG. 5F). In some embodiments, the web-clip widget creation icon includes text, such as "Create Web-Clip Widget" or "Add to Home Screen."

An activation of the web-clip widget creation icon (e.g., 3973) is detected (710). In some embodiments, detecting activation of the web-clip widget creation icon includes detecting a finger gesture (e.g., a tap gesture) on the web-clip widget creation icon.

In response to detecting activation of the web-clip widget creation icon, a web-clip widget is created (712) corresponding to the displayed web page or portion thereof.

In some embodiments, the web-clip widget corresponds to a structural element of the web page, such as a particular block within the web page. In some embodiments, the web-clip widget corresponds to a user-specified rectangle in the web page.

In some embodiments, creating the web-clip widget includes (714) requesting a name for the web-clip widget, receiving the name, and storing the name. In some embodiments, requesting the name includes displaying a keyboard to receive input for the name. For example, in UI 3900H (FIG. 5H), the user is prompted to enter the widget name in the text entry box 3960 using the keyboard 616.

In some embodiments, creating the web-clip widget includes creating (716) an icon corresponding to the web-clip widget and displaying (718) the icon corresponding to the web-clip widget in a menu (e.g., UI 400A or 400B, FIG. 4A or 4B) or list (e.g., UI 400C, FIG. 4C) of icons. In some embodiments, the icon corresponding to the web-clip widget is created in response to detecting an activation of an add-widget icon (e.g., icon 3928, FIG. 5H). In some embodiments, the icon corresponding to the web-clip widget is created in response to detecting an activation of the web-clip widget creation icon (e.g., 3973, FIG. 5F).

In some embodiments, the menu or list of icons comprises a menu or list of applications and widgets (e.g., UI 400A, FIG. 4A) on the multifunction device. In some embodiments, the menu or list of icons comprises a menu or list of widgets on the multifunction device. In some embodiments, the menu or list of icons comprises a menu or list of user-created widgets (e.g., UI 400B or 400C, FIG. 4B or 4C) on the multifunction device.

In some embodiments, the icon corresponding to the web-clip widget is displayed in a previously vacant area in the menu of icons. In some embodiments, the previously vacant area is a first available vacancy (e.g., 604-1, FIG. 6B) in the menu of icons. In some embodiments, an animation is displayed of the icon corresponding to the web-clip widget moving into the previously vacant area. For example, FIGS. 6A-6D illustrate an animation in which an icon corresponding to the web-clip widget 149-6-7 is created and moved into a previously vacant area in UI 600B.

In some embodiments, the web-clip widget is stored (720) as a bookmark in a browser application. In some embodiments, as described in U.S. patent application Ser. No. 11/469,838, "Presenting and Managing Clipped Content," filed on Sep. 1, 2006, which application is incorporated by reference herein in its entirety, the web-clip widget is encoded as a URL associated with the bookmark.

In some embodiments, the web-clip widget is sent (722) to a web server for storage. In some embodiments, the web-clip widget stored on the web server is publicly accessible. Storing a user-created web-clip widget on a publicly accessible server allows the user to share the web-clip widget with other users.

Figure 7B:
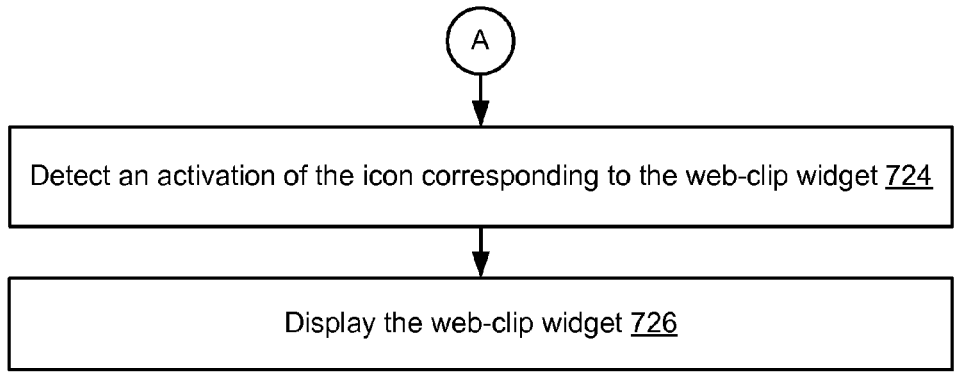

In some embodiments, as illustrated in FIG. 7B, an activation of the icon corresponding to the web-clip widget is detected (724). For example, a finger gesture (e.g., a tap gesture 606, FIG. 6E) is detected on the icon. In response, the web-clip widget is displayed (726). For example, in response to detecting the tap gesture 606, block 3914-5 is displayed, as illustrated in FIG. 6A in the browser application or, as described above, as its own mini-application without other elements of the browser UI.

Figure 7C:
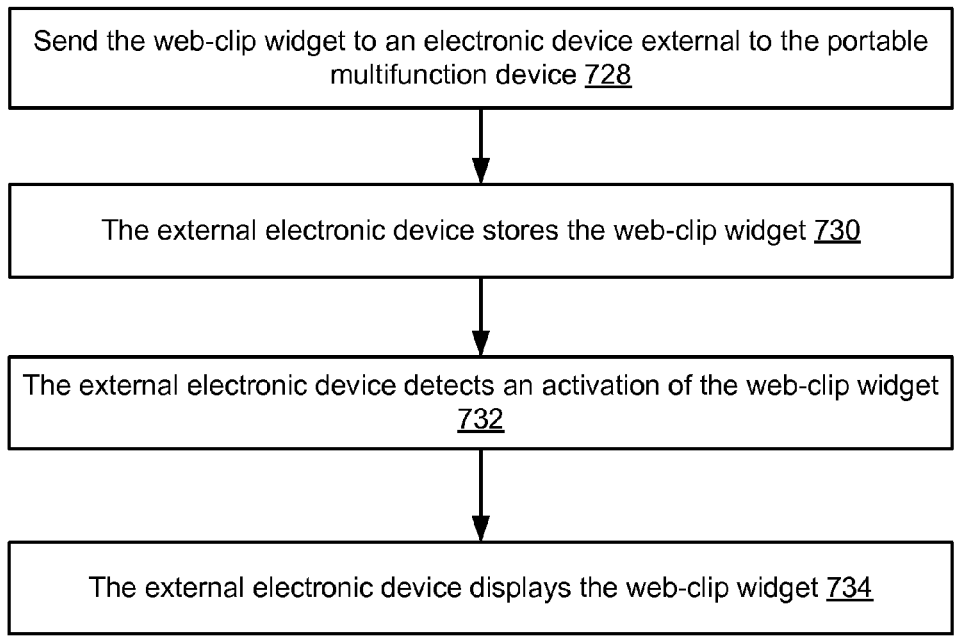

In some embodiments, as illustrated in FIG. 7C, the web-clip widget is sent (728) to an electronic device external to the portable multifunction device. For example, the web-clip widget may be sent to another portable multifunction device 100. The external electronic device stores (730) the web-clip widget, detects an activation (732) of the web-clip widget, and displays the web-clip widget (734). In some embodiments, the web-clip widget is sent to the external electronic device via email. In some embodiments, the web-clip widget is sent to the external electronic device via instant messaging. As used herein, "instant messaging" refers to both telephony-based messages (e.g., messages sent using Multimedia Message Service (MMS)) and Internet-based messages (e.g., messages sent using Extensible Messaging and Presence Protocol (XMPP), Session Initiation Protocol for Instant Messaging and Presence Leveraging Extensions (SIMPLE), or Instant Messaging and Presence Service (IMPS)). Sending a user-created web-clip widget to another electronic device provides the user with a way to share the web-clip widget with other users. Operations 728-734 of FIG. 7C may be performed as part of process 700 or may be performed as an independent process.

Figure 7D:
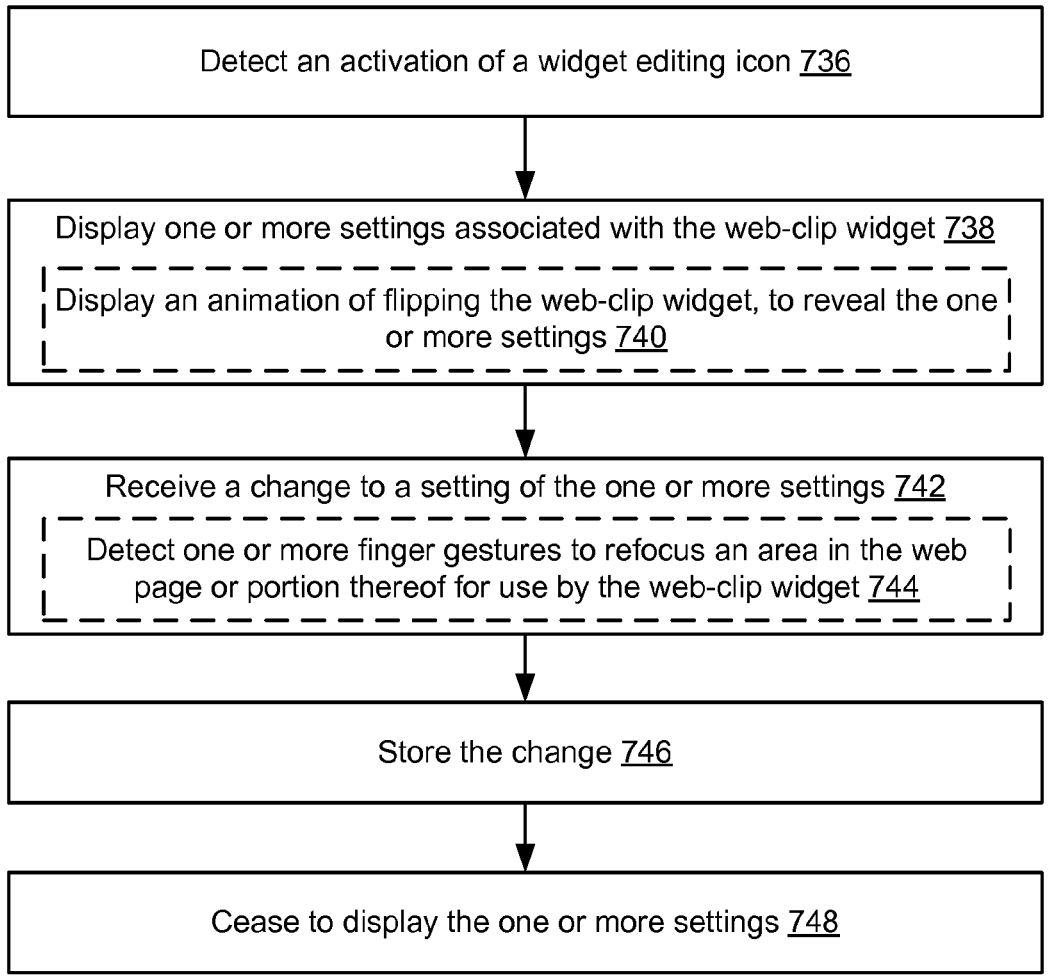

In some embodiments, as illustrated in FIG. 7D, an activation of a widget editing icon (e.g., edit widget icon 3970, FIG. 5M) is detected (736). In response to detecting the activation of the widget editing icon, one or more settings associated with the web-clip widget are displayed (738). In some embodiments, an animation is displayed (740) of flipping the web-clip widget, to reveal the one or more settings. As described in U.S. patent application Ser. No. 11/145,561, "Presenting Clips of Content," filed on Jun. 3, 2005, which application is incorporated by reference herein in its entirety, settings (e.g., preferences) associated with a web-clip widget may be displayed by flipping the widget to reveal a user interface to edit the settings. A change to a setting of the one or more settings is received (742). In some embodiments, one or more finger gestures are detected to refocus (744) an area in the web-clip or portion thereof for use by the web-clip widget. As described in the "Presenting Clips of Content" application, the user interface revealed by flipping the widget may include a refocus preference to allow redefinition of the selected area of the web page for use by the web-clip widget. The change is stored (746) and display of the one or more settings is ceased (748). Operations 736-748 of FIG. 7D may be performed as part of process 700 or may be performed as an independent process.

In some embodiments, each operation of process 700 is performed by a portable multifunction device. In some embodiments, however, one or more operations of process 700 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a JavaScript file, in accordance with some embodiments, or an XML file and/or a JavaScript file, in accordance with some other embodiments) associated with the widget may be generated by the server system and then transmitted to the portable multifunction device. In general, operations in the widget creation process may be performed by the portable multifunction device, by the server system, or by a combination thereof.

Process 700 creates a widget that allows a user to view a specified area in a web page upon activation of the widget. The user thus is spared from having to enlarge and center the area of the web page that is of interest, such as a particular block of interest, each time the user visits the web page.

Figure 7E:
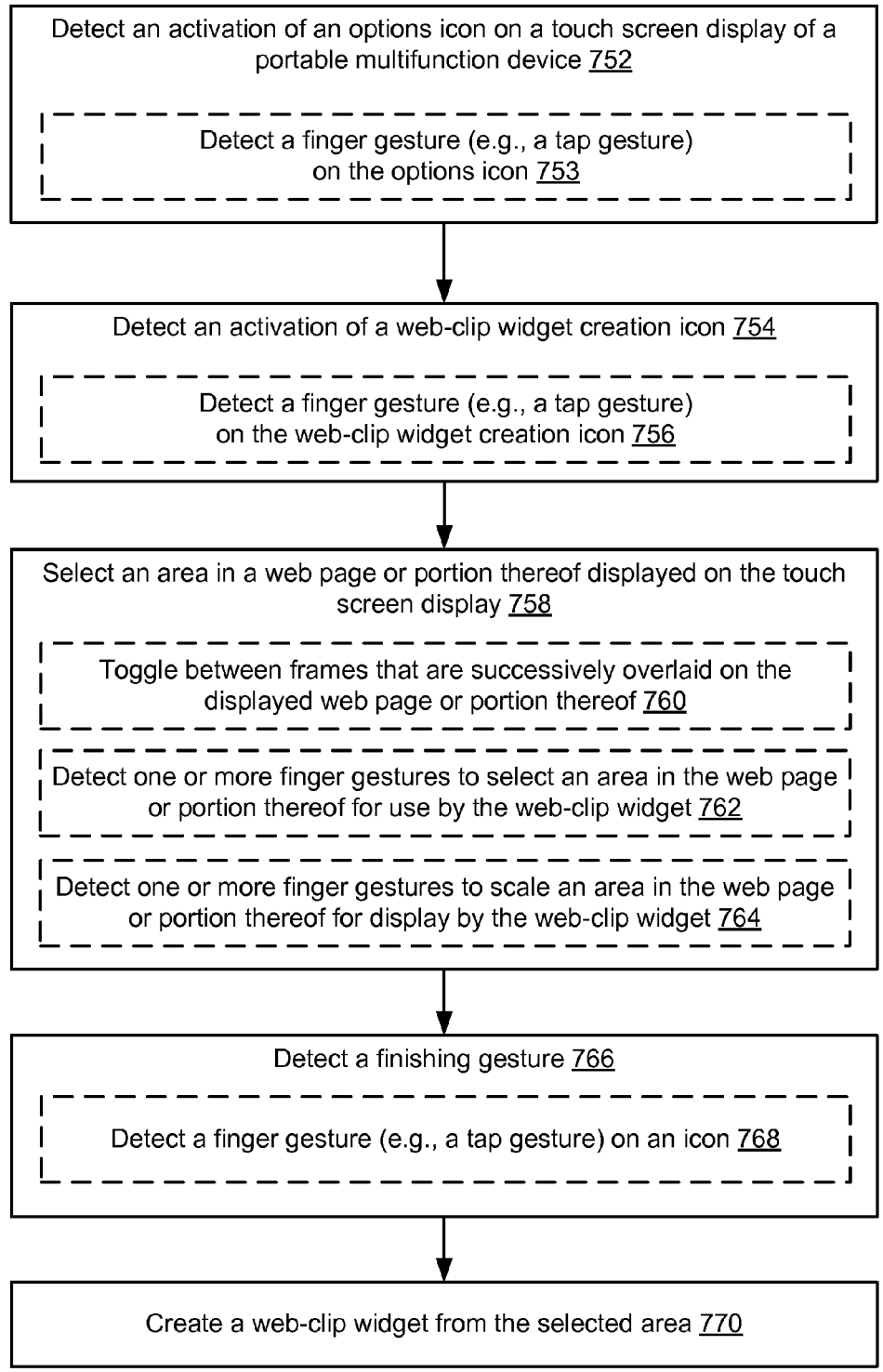

FIG. 7E is a flow diagram illustrating a process 750 for creating a web-clip widget from a web page or portion thereof in accordance with some embodiments. While the web-clip widget creation process 750 described below includes a number of operations that appear to occur in a specific order, it should be apparent that the process 750 can include more or fewer operations, which can be executed serially or in parallel (e.g., using parallel processors or a multi-threading environment), an order of two or more operations may be changed and/or two or more operations may be combined into a single operation.

On a touch screen display of a portable multifunction device, an activation of an options icon (e.g., icon 3920, FIG. 5A) is detected (752). In some embodiments, a finger gesture (e.g., a tap gesture) is detected (753) on the options icon.

An activation of a web-clip widget creation icon (e.g., icon 3973, FIG. 5F) is detected (754). In some embodiments, a finger gesture (e.g., a tap gesture) is detected (756) on the web-clip widget creation icon.

An area in a web page or portion thereof displayed on the touch screen display is selected (758). In some embodiments, selecting the area includes toggling (760) between frames that are successively overlaid on the displayed web page or portion thereof. For example, in UI 3900J (FIG. 5J), a frame 3958 is displayed overlaid on the web page 3912 such that it frames block 2 3914-2. Upon activation of a toggle icon 3956, display of the frame 3958 is ceased and another frame is displayed overlaid on the web page 3912 such that it frames another block (e.g., block 3 3914-3). Thus, in some embodiments, the frames successively highlight blocks and other structural elements of the web page. As described in U.S. patent application Ser. No. 11/620,492, "Selecting and Manipulating Web Content," filed on Jan. 5, 2007, which application is incorporated by reference herein in its entirety, structural elements that are displayed in a web page can be identified during the web-clip widget creation process.

In some embodiments, selecting the area includes detecting (762) one or more finger gestures to select an area in the web page or portion thereof for use by the web-clip widget. In some embodiments, selecting the area includes detecting (764) one or more finger gestures to scale an area in the web page or portion thereof for display by the web-clip widget. Examples of finger gestures used to select and/or scale an area in the web page or portion thereof include a single tap gesture 3923 or 3925 to center and enlarge a block (FIG. 5A); a single tap gesture 3927 or 3935 to center an adjacent enlarged block; a multi-touch depinching gesture (3931 and 3933) to enlarge the web page; a multi-touch pinching gesture (not shown) to reduce the web page; swipe gestures such as a substantially vertical swipe 3937, an upward or diagonal swipe 3939, and/or other swipe gestures (not shown) to scroll the web page; and/or a multi-touch rotation gesture (3941 and 3943) to select a portrait or landscape view (FIG. 5C).

A finishing gesture is detected (766). In some embodiments, a finger gesture (e.g., a tap gesture) on an icon (e.g., add widget icon 3954, FIG. 5J or 5K) is detected (768). A web-clip widget is created (770) from the selected area.

In some embodiments, creating the web-clip widget includes requesting a name for the web-clip widget, receiving the name, and storing the name, in accordance with operation 714 of process 700 (FIG. 7A).

In some embodiments, creating the web-clip widget includes creating an icon corresponding to the web-clip widget, in accordance with operation 716 of process 700. In some embodiments, the icon corresponding to the web-clip widget is displayed in a menu or list of icons, in accordance with operation 718 of process 700. In some embodiments, the menu or list of icons comprises a menu or list of applications and widgets on the multifunction device. In some embodiments, the menu or list of icons comprises a menu or list of widgets on the multifunction device. In some embodiments, the menu or list of icons comprises a menu or list of user-created widgets on the multifunction device.

In some embodiments, an activation of the icon corresponding to the web-clip widget is detected and the web-clip widget is displayed, in accordance with operations 724 and 726 (FIG. 6B) of process 700.

In some embodiments, settings associated with the web-clip widget are edited, in accordance with operations 736-748 (FIG. 7D) of process 700.

In some embodiments, the web-clip widget is stored as a bookmark in a browser application, in accordance with operation 720 of process 700 (FIG. 7A).

In some embodiments, the web-clip widget is sent to a web server for storage, in accordance with operation 722 of process 700. In some embodiments, the web-clip widget is sent to an external electronic device, in accordance with operations 728-734 (FIG. 7C) of process 700.

In some embodiments, each operation of process 750 is performed by a portable multifunction device. In some embodiments, however, one or more operations of process 750 are performed by a server system in communication with a portable multifunction device via a network connection. The portable multifunction device may transmit data associated with the widget creation process to the server system and may receive information corresponding to the widget in return. For example, code (e.g., an HTML file, a CSS file, and/or a JavaScript file, in accordance with some embodiments, or an XML file and/or a JavaScript file, in accordance with some other embodiments) associated with the widget may be generated by the server system and then transmitted to the portable multifunction device. In general, operations in the widget creation process may be performed by the portable multifunction device, by the server system, or by a combination thereof.

Process 750, like process 700, creates a widget that allows a user to view a specified area in a web page upon activation of the widget, thus sparing the user from having to enlarge and center the area of the web page that is of interest each time the user visits the web page.

Figure 7F:
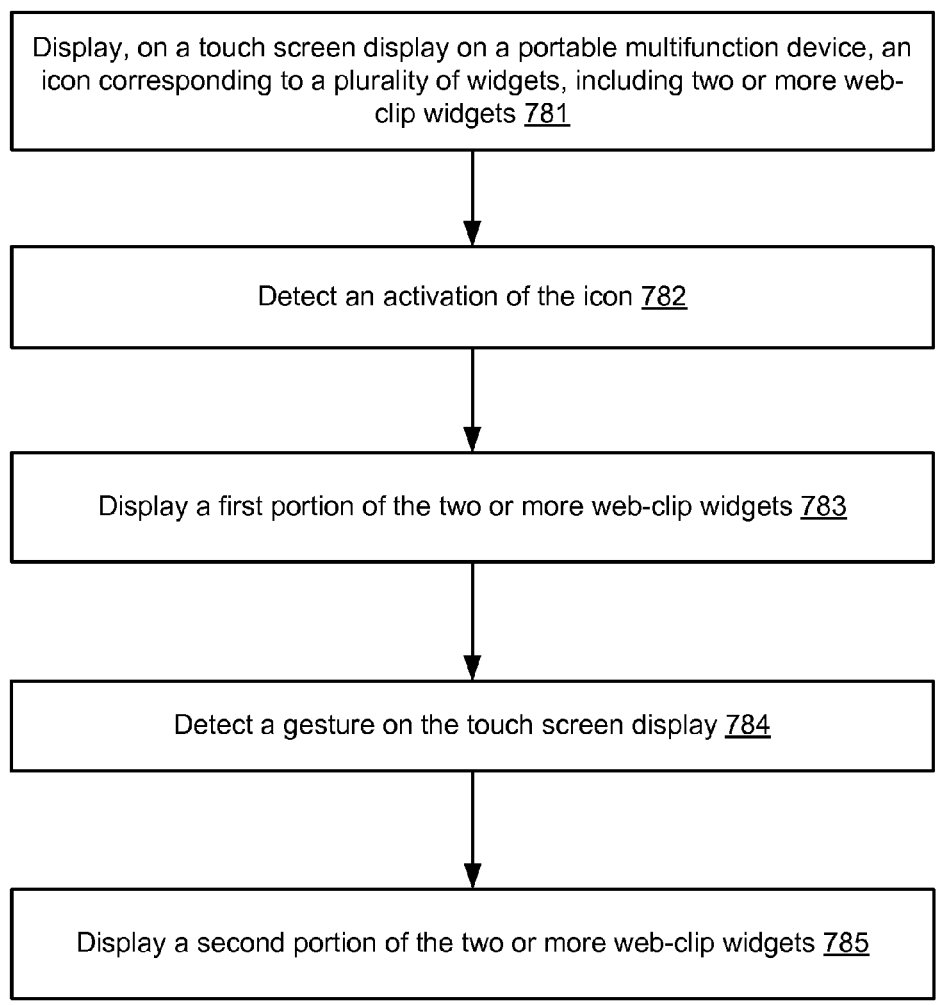

FIG. 7F is a flow diagram illustrating a process 780 for displaying web-clip widgets in accordance with some embodiments. On a touch screen display on a portable multifunction device, an icon is displayed (781) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (782). For example, a finger gesture (e.g., a tap gesture) on the icon is detected.

In response to detecting the activation, a first portion of the two or more web-clip widgets is displayed (783). For example, UI 3900L (FIG. 5L) displays a first portion that includes a first user-created widget 149-6-1 and a portion of a second user-created widget 149-6-2. In another example, UI 3900M (FIG. 5M) displays a first portion that includes the second user-created widget 149-6-2 and no other widgets or portions thereof. Thus, in some embodiments, the first portion is a first web-clip widget.

A gesture is detected (784) on the touch screen display. In some embodiments, the gesture is a scrolling gesture. For example, a swipe gesture 3962 (FIGS. 5L and 5M) or 3963 (FIG. 5M) is detected on the touch screen display.

In response to detecting the gesture, a second portion of the two or more web-clip widgets is displayed (785). In some embodiments, in response to detecting the gesture, a displayed portion of the two or more web-clip widgets is scrolled from the first portion to the second portion. For example, in response to detecting an upward scroll gesture 3962 in UI 3900L (FIG. 5L), a second portion is displayed that includes more or all of the second user-created widget 149-6-2 and less or none of the first user-created widget 149-6-1. In some embodiments, the second portion is a second web-clip widget (e.g., the second user-created widget 149-6-2).

In some embodiments, the gesture is a de-pinching gesture (e.g., gestures 3931 and 3933, FIG. 5C). In response to detecting the de-pinching gesture, a displayed portion of the two or more web-clip widgets is zoomed in from the first portion to the second portion.

In some embodiments, the gesture is a finger tap on an area within the first portion (e.g., a finger tap analogous to gesture 3923, FIG. 5A), and the displayed second portion is centered on the area and is zoomed in with respect to the first portion.

Figure 7G:
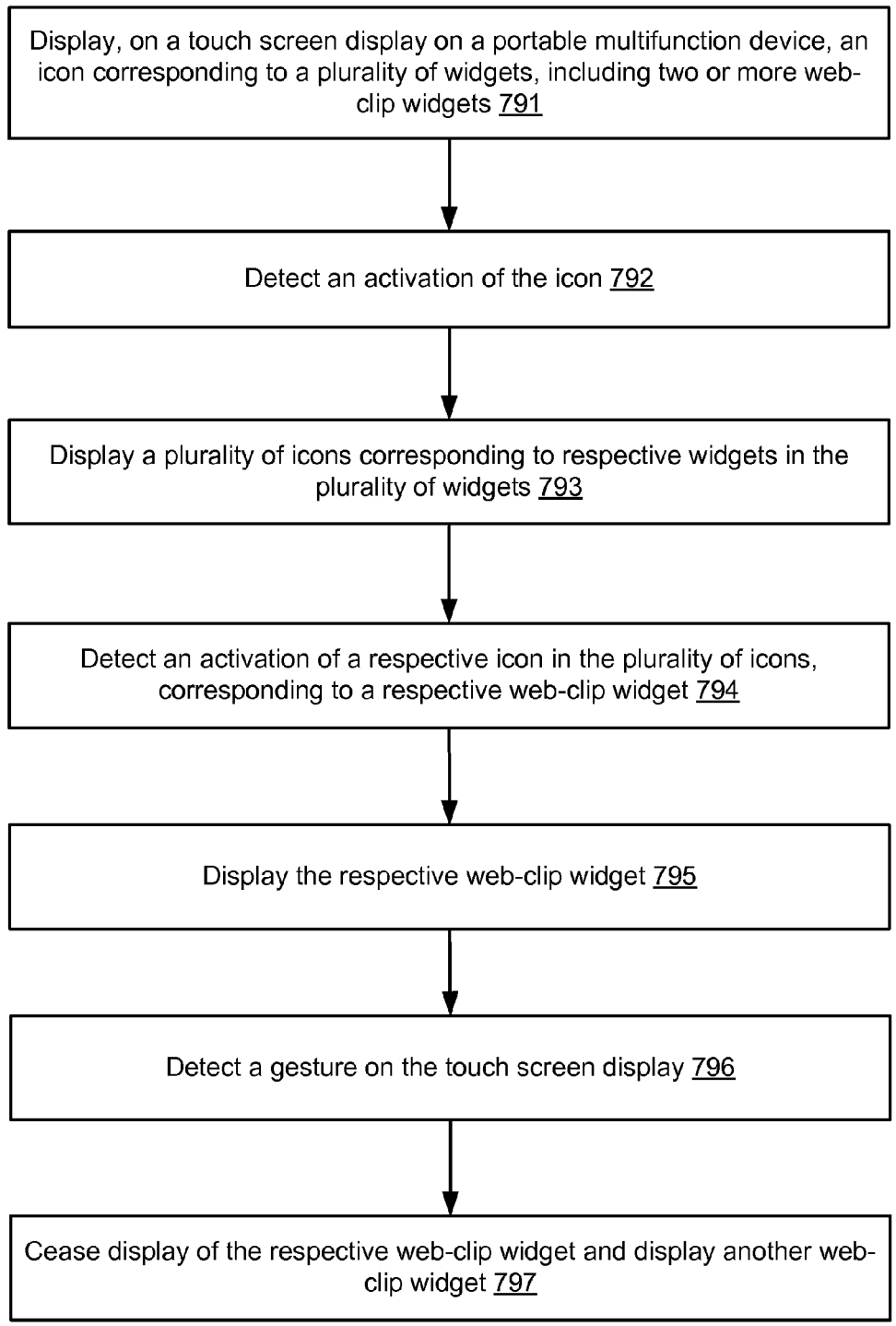

FIG. 7G is a flow diagram illustrating a process 790 for displaying web-clip widgets in accordance with some embodiments. On a touch screen display on a portable multifunction device, an icon is displayed (791) corresponding to a plurality of widgets, including two or more web-clip widgets. For example, in some embodiments, the icon for user-created widget 149-6 (FIG. 4A) corresponds to multiple widgets including multiple web-clip widgets.

An activation of the icon is detected (792). For example, a finger gesture (e.g., a tap gesture) on the icon is detected.

In response to detecting the activation of the icon, a plurality of icons corresponding to respective widgets in the plurality of widgets is displayed (793). In some embodiments, the plurality of icons is displayed in a menu, or in a list. For example, UI 400B (FIG. 4B) displays a menu of icons corresponding to user-created widgets 149-6-1 through 149-6-6, and UI 400C (FIG. 4C) displays a list of icons corresponding to user-created widgets 149-6-1 through 149-6-6.

Figure 5M:
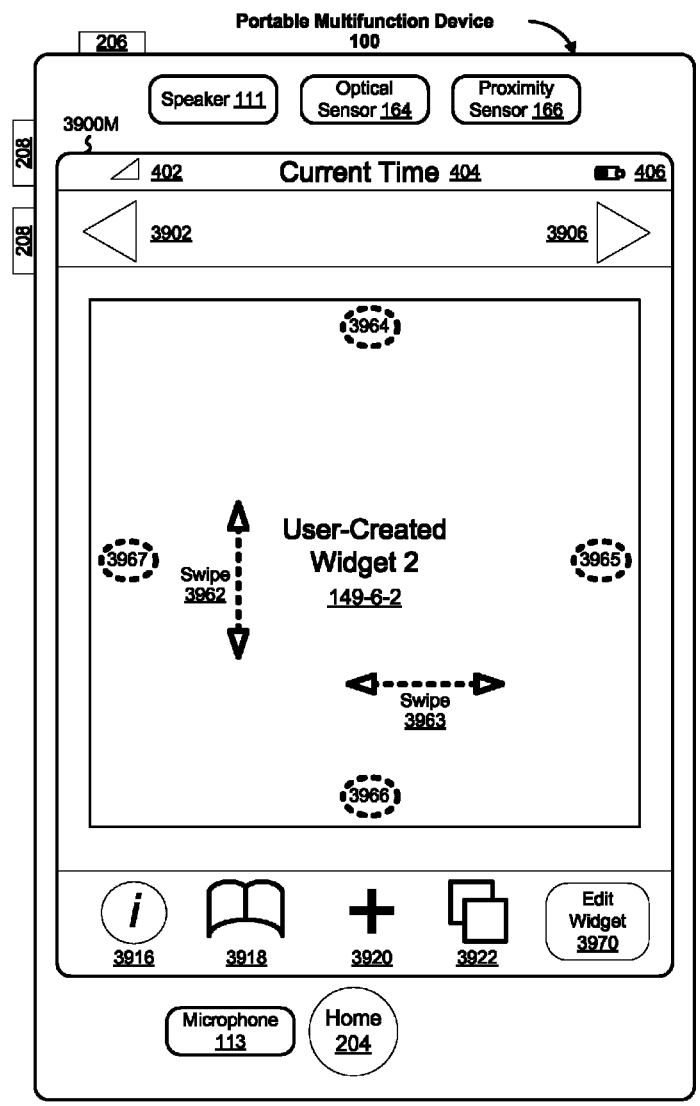

An activation is detected (794) of a respective icon in the plurality of icons corresponding to a respective web-clip widget. In response to detecting the activation of the respective icon, the respective web-clip widget is displayed (795). For example, in response to detecting an activation of an icon corresponding to user-created widget 149-6-2 in UI 400B or UI 400C, user-created widget 149-6-2 is displayed in UI 3900M (FIG. 5M).

A gesture is detected (796) on the touch screen display. For example, a swipe gesture 3962 or 3963 (FIG. 5M) is detected on the touch screen display. Alternately, a tap gesture 3964 at the top or a tap gesture 3966 at the bottom of the displayed widget 149-6-2 is detected. In another example, a tap gesture 3965 at the right side or a tap gesture 3967 at the left side of the displayed widget 149-6-2 is detected.

In response to detecting the gesture, display of the respective web-clip widget is ceased and another web-clip widget is displayed (797). For example, in response to detecting a downward swipe 3962, a substantially horizontal left-to-right swipe 3963, a tap gesture 3967 at the left side of the displayed widget 149-6-2, or a tap gesture 3964 at the top of the displayed widget 149-6-2, a previous user-created widget 149-6-1 is displayed. In response to detecting an upward swipe 3962, a substantially horizontal right-to-left swipe 3963, a tap gesture 3965 at the right side of the displayed widget 149-6-2, or a tap gesture 3966 at the bottom of the displayed widget 149-6-2, a next user-created widget 149-6-3 is displayed.

Processes 780 and 790 thus provide user-friendly ways to view multiple specified areas in web pages without having to surf between successive web pages and without having to enlarge and center an area of interest in each web page.

FIG. 7H is a flow diagram illustrating a process 7000 for displaying a web-clip widget in accordance with some embodiments. On a touch screen display on a portable multifunction device, an icon for a web-clip widget (e.g., 149-6-7, FIG. 6E) is displayed (7002). The web-clip widget corresponds to a user-specified area of a web page (e.g., block 3914-5, FIG. 6A).

In some embodiments, the icon is displayed (7004) in a menu or list of icons. In some embodiments, the menu or list of icons comprises a menu or list of applications and widgets (e.g., UI 400A, FIG. 4A) on the multifunction device. In some embodiments, the menu or list of icons comprises a menu or list of widgets on the multifunction device. In some embodiments, the menu or list of icons comprises a menu or list of user-created widgets (e.g., UI 400B or 400C, FIG. 4B or 4C) on the multifunction device.

In some embodiments, the user-specified area was previously selected by translating and scaling (7006) a displayed portion of the web page. In some embodiments, the user-specified area was previously selected by centering and enlarging (7008) a displayed portion of the web page. Examples of finger gestures used to translate, scale, center, and/or enlarge an area in the web page include a tap gesture 3923 or 3925 to center and enlarge a block (FIG. 5A); a tap gesture 3927 or 3935 to center an adjacent enlarged block; a multi-touch depinching gesture (3931 and 3933, FIG. 5C) to enlarge the web page; a multi-touch pinching gesture (not shown) to reduce the web page; swipe gestures such as a substantially vertical swipe 3937, an upward or diagonal swipe 3939, and/or other swipe gestures (not shown) to translate the web page; and/or a multi-touch rotation gesture (3941 and 3943, FIG. 5C) to select a portrait or landscape view.

An activation of the icon is detected (7010). In some embodiments, a finger gesture (e.g., a tap gesture 606, FIG. 6E) is detected (7012) on the icon.

In response to detecting activation of the icon, the user-specified area of the web page is displayed (7014). For example, in response to activation of the icon for the web-clip widget 149-6-7 (FIG. 6E), block 3914-5 is displayed (FIG. 6A).

The process 7000 allows a user to view a specified area in a web page upon activation of the corresponding icon. The user thus is spared from having to enlarge and center the area of the web page that is of interest, such as a particular block of interest, each time the user visits the web page.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    at a portable multifunction device with a touch screen display,
        storing information corresponding to a web-clip widget, wherein the web-clip widget corresponds to a user-specified area of a web page;
        detecting a first user input to display a menu of applications;
        in response to detecting the first user input, displaying the menu of applications, wherein the menu of applications displays:
            a plurality of application icons, wherein selection of a respective application icon results in display of an application that corresponds to the respective application icon; and
            a web-clip widget icon for the web-clip widget, the web-clip widget icon presenting content from the user-specified area of the web page at a reduced scale within the web-clip widget icon;
        while displaying the menu of applications, detecting a second user input to select the web-clip widget icon, wherein the second user input includes detecting a contact on the touch screen display at a location that corresponds to the web-clip widget icon; and
        in response to detecting the second user input, ceasing to display the menu of applications and displaying the user-specified area of the web page in a browser application on the touch screen display.

2. The method of claim 1, wherein the user-specified area was previously selected by translating and scaling a displayed portion of the web page.

3. The method of claim 1, wherein the user-specified area was previously selected by centering and enlarging a displayed portion of the web page.

4. The method of claim 1, wherein the menu of applications is displayed as a list of application icons.

5. The method of claim 4, wherein the menu of application icons comprises a list of applications and widgets on the multifunction device.

6. The method of claim 4, the menu of application icons comprises a list of widgets on the multifunction device.

7. The method of claim 4, wherein the menu of application icons comprises a list of user-created web-clip widgets on the multifunction device.

8. The method of claim 1, wherein the second user input is a finger gesture on the web-clip widget icon.

9. The method of claim 8, wherein the finger gesture is a tap gesture.

10. The method of claim 1, including, in response to the second user input, ceasing to display the menu of applications on the touch screen display.

11. A graphical user interface on a portable multifunction device with a touch screen display, comprising:
    a web-clip widget icon for a web-clip widget, the web-clip widget corresponding to a user-specified area of a web page and presenting content from the user-specified area of the web page at a reduced scale within the web-clip widget icon; and
    the user-specified area of the web page;
    wherein:
        a first user input to display a menu of applications is detected;
        in response to detection of the first user input, the menu of applications is displayed on the touch screen display, the menu of applications displaying:
            a plurality of application icons, wherein selection of a respective application icon results in display of an application that corresponds to the respective application icon, and
            the web-clip widget icon;
        a second user input to select the web-clip widget icon is detected while the menu of applications is displayed, wherein the second user input includes detecting a contact on the touch screen display at a location that corresponds to the web-clip widget icon; and
        in response to detecting the second input, the menu of applications ceases to be displayed and the user-specified area of the web page is displayed in a browser application on the touch screen display.

12. A portable multifunction device, comprising:
    a touch screen display;
    one or more processors;
    memory; and
    one or more programs, wherein the one or more programs are stored in the memory and configured to be executed by the one or more processors, the one or more programs including instructions for:
        storing information corresponding to a web-clip widget, wherein the web-clip widget corresponds to a user-specified area of a web page;
        detecting a first user input to display a menu of applications;
        in response to detecting the first user input, displaying the menu of applications, wherein the menu of applications displays:
            a plurality of application icons, wherein selection of a respective application icon results in display of an application that corresponds to the respective application icon; and
            a web-clip widget icon for the web-clip widget, the web-clip widget icon presenting content from the user-specified area of the web page at a reduced scale within the web-clip widget icon;
        while displaying the menu of applications, detecting a second user input to select the web-clip widget icon, wherein the second user input includes detecting a contact on the touch screen display at a location that corresponds to the web-clip widget icon; and
        ceasing to display the menu of applications and displaying the user-specified area of the web page in a browser application on the touch screen display, in response to detecting the second user input.

13. The device of claim 12, wherein the user-specified area was previously selected by translating and scaling a displayed portion of the web page.

14. The device of claim 12, wherein the user-specified area was previously selected by centering and enlarging a displayed portion of the web page.

15. The device of claim 12, wherein the menu of applications is displayed as a list of application icons.

16. The device of claim 15, wherein the menu of application icons comprises a list of applications and widgets on the multifunction device.

17. The device of claim 15, the menu of application icons comprises a list of widgets on the multifunction device.

18. The device of claim 15, wherein the menu of application icons comprises a list of user-created web-clip widgets on the multifunction device.

19. The device of claim 12, wherein the second user input is a finger gesture on the web-clip widget icon.

20. The device of claim 19, wherein the finger gesture is a tap gesture.

21. The device of claim 12, including instructions for, in response to the second user input, ceasing to display the menu of applications on the touch screen display.

22. A non-transitory computer readable storage medium having stored therein instructions, which when executed by a portable multifunction device with a touch screen display, cause the device to:
   store information corresponding to a web-clip widget, wherein the web-clip widget corresponds to a user-specified area of a web page;
   detect a first user input to display a menu of applications;
   in response to detecting the first user input, display the menu of applications, wherein the menu of applications displays:
      a plurality of application icons, wherein selection of a respective application icon results in display of an application that corresponds to the respective application icon; and
      a web-clip widget icon for the web-clip widget, the web-clip widget icon including presenting content from the user-specified area of the web page at a reduced scale within the web-clip widget icon;
   while displaying the menu of applications, detect a second user input to select the web-clip widget icon, wherein the second user input includes detecting a contact on the touch screen display at a location that corresponds to the web-clip widget icon; and
   cease to display the menu of applications and display the user-specified area of the web page in a browser application on the touch screen display, in response to detecting the second user input.

23. The computer readable storage medium of claim 22, wherein the user-specified area was previously selected by translating and scaling a displayed portion of the web page.

24. The computer readable storage medium of claim 22, wherein the user-specified area was previously selected by centering and enlarging a displayed portion of the web page.

25. The computer readable storage medium of claim 22, wherein the menu of applications is displayed as a list of application icons.

26. The computer readable storage medium of claim 25, wherein the list of application icons comprises a list of applications and widgets on the multifunction device.

27. The computer readable storage medium of claim 25, the list of application icons comprises a list of widgets on the multifunction device.

28. The computer readable storage medium of claim 25, wherein the list of application icons comprises a list of user-created web-clip widgets on the multifunction device.

29. The computer readable storage medium of claim 22, wherein the second user input is a finger gesture on the web-clip widget icon.

30. The computer readable storage medium of claim 29, wherein the finger gesture is a tap gesture.

31. The computer readable storage medium of claim 22, including instructions which cause the device to, in response to the second user input, cease to display the menu of applications on the touch screen display.

\* \* \* \* \*

UNITED STATES PATENT AND TRADEMARK OFFICE
CERTIFICATE OF CORRECTION

PATENT NO. : 8,788,954 B2
APPLICATION NO. : 11/969912
DATED : July 22, 2014
INVENTOR(S) : Stephen O. Lemay et al.

It is certified that error appears in the above-identified patent and that said Letters Patent is hereby corrected as shown below:

Title Page, References Cited

On page 5, in column 1, under "Other Publications", line 16, delete "nacnewsworld" and insert -- macnewsworld --, therefor.

On page 5, in column 2, under "Other Publications", line 16, delete "Appl.n No." and insert -- Appl. No. --, therefor.

On page 6, in column 1, under "Other Publications", line 46, delete "Appie Inc.," and insert -- Apple Inc., --, therefor.

On page 6, in column 1, under "Other Publications", line 58, delete "emeseme" and insert -- emesene --, therefor.

On page 6, in column 2, under "Other Publications", line 1, delete "Ernoticons,"" and insert -- Emoticons," --, therefor.

On page 6, in column 2, under "Other Publications", line 2, delete "wwwsharewareconnection" and insert -- www.sharewareconnection --, therefor.

On page 6, in column 2, under "Other Publications", line 33, delete "Patent Patent" and insert -- Patent --, therefor.

On page 6, in column 2, under "Other Publications", line 40, delete "correponds" and insert -- corresponds --, therefor.

On page 7, in column 2, under "Other Publications", line 10, delete "Pantent" and insert -- Patent --, therefor.

Signed and Sealed this
Sixth Day of January, 2015

Michelle K. Lee
*Deputy Director of the United States Patent and Trademark Office*

CERTIFICATE OF CORRECTION (continued)
U.S. Pat. No. 8,788,954 B2

In the Claims

In column 33, line 40, in claim 22, delete "icon including" and insert -- icon --, therefor.